(12) United States Patent
Ertas et al.

(10) Patent No.: US 10,982,713 B2
(45) Date of Patent: Apr. 20, 2021

(54) CLOSED CYCLE HEAT ENGINE

(71) Applicant: General Electric Company, Schenectady, NY (US)

(72) Inventors: Bugra Han Ertas, Niskayuna, NY (US); Douglas Carl Hofer, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 15/933,672

(22) Filed: Mar. 23, 2018

(65) Prior Publication Data
US 2019/0293117 A1     Sep. 26, 2019

(51) Int. Cl.
*F16C 32/06* (2006.01)
*F01D 25/16* (2006.01)
(Continued)

(52) U.S. Cl.
CPC .......... *F16C 32/0614* (2013.01); *F01D 25/16* (2013.01); *F01K 7/32* (2013.01);
(Continued)

(58) Field of Classification Search
CPC ........ F01K 25/08; F01K 25/10; F01K 25/103; F01K 7/32; F16C 32/0603; F16C 32/0614; F16C 32/0618; F16C 32/0622; F16C 32/0625; F16C 32/0681; F16C 32/0685; F16C 32/0688; F16C 32/0692; F16C 32/0696; F03G 6/064; F01D 25/16; F01D 25/22; F01D 5/026; F05D 2240/52; F05D 2240/53; F05D 2240/54; F05D 2210/10;
(Continued)

(56) References Cited

U.S. PATENT DOCUMENTS 4,464,908 A   8/1984   Landerman et al.
4,624,109 A   11/1986  Minovitch
(Continued)

FOREIGN PATENT DOCUMENTS

JP    H05164888 A    6/1993

OTHER PUBLICATIONS

International Search Report and Written Opinion, dated Apr. 8, 2019, for related International application No. PCT/US2018/065951.
(Continued)

*Primary Examiner* — Mark A Laurenzi
*Assistant Examiner* — Xiaoting Hu
(74) *Attorney, Agent, or Firm* — Armstrong Teasdale LLP

(57) ABSTRACT

Heat engines employing fluid bearing assemblies hermetically sealed with a closed flowpath for a working fluid are generally disclosed. For example, the heat engine includes a rotating drivetrain and a fluid bearing assembly. The rotating drivetrain includes a compressor section, an expander section, and a heat exchanger. The compressor section and expander section together define at least in part a closed flowpath for the flow of a working fluid. The heat exchanger is thermally coupled to the closed flowpath for adding heat to the working fluid. The fluid bearing assembly is configured to utilize the working fluid to support the rotating drivetrain. Further, the fluid bearing assembly is hermetically sealed with the closed flowpath.

19 Claims, 12 Drawing Sheets

(51) Int. Cl.
*F03G 6/06* (2006.01)
*F01K 25/10* (2006.01)
*F02C 1/05* (2006.01)
*F01K 7/32* (2006.01)

(52) U.S. Cl.
CPC .............. *F01K 25/103* (2013.01); *F02C 1/05* (2013.01); *F03G 6/064* (2013.01); *F05D 2210/10* (2013.01); *F05D 2220/30* (2013.01); *F05D 2240/52* (2013.01); *F05D 2240/53* (2013.01)

(58) Field of Classification Search
CPC .............. F05D 2220/30; F04D 29/0405; F04D 29/044; F04D 29/054; F04D 29/0413; F04D 29/047; F04D 29/0473; F04D 29/0476; F04D 29/0513; F04D 29/057; F04D 29/063; F02C 1/04; F02C 1/05
See application file for complete search history.

(56) References Cited

U.S. PATENT DOCUMENTS

| | | | | |
|---|---|---|---|---|
| 5,102,305 | A | * | 4/1992 | Bescoby ............... F01D 5/02 416/241 B |
| 5,248,239 | A | | 9/1993 | Andrews |
| 6,367,241 | B1 | | 4/2002 | Ress, Jr. et al. |
| 6,851,862 | B2 | | 2/2005 | Gozdawa |
| 6,957,945 | B2 | | 10/2005 | Tong et al. |
| 7,195,443 | B2 | | 3/2007 | Vandervort et al. |
| 7,948,105 | B2 | | 5/2011 | Agrawal et al. |
| 8,397,506 | B1 | | 3/2013 | Wright et al. |
| 8,480,352 | B2 | | 7/2013 | Zheng et al. |
| 8,893,499 | B2 | | 11/2014 | Maier |
| 9,476,428 | B2 | | 10/2016 | Agrawal et al. |
| 9,746,029 | B1 | | 8/2017 | Mook et al. |
| 2008/0038109 | A1 | * | 2/2008 | Sandstede ............... F01D 25/22 415/111 |
| 2011/0305558 | A1 | * | 12/2011 | Omori ................... F04D 17/12 415/122.1 |
| 2013/0091869 | A1 | * | 4/2013 | Bardon ................. F01D 15/005 62/6 |
| 2013/0098037 | A1 | * | 4/2013 | Maier ...................... F02G 1/00 60/647 |
| 2014/0084588 | A1 | | 3/2014 | Agrawal et al. |
| 2015/0117803 | A1 | * | 4/2015 | Haile ................ F16C 32/0688 384/119 |
| 2016/0047309 | A1 | | 2/2016 | Davidson et al. |
| 2016/0222882 | A1 | * | 8/2016 | Harada .................... F02C 1/05 |
| 2016/0348539 | A1 | | 12/2016 | Peter et al. |
| 2017/0191379 | A1 | * | 7/2017 | Preuss .................... F01D 25/16 |
| 2017/0298752 | A1 | | 10/2017 | Mook et al. |
| 2017/0298766 | A1 | | 10/2017 | Ertas et al. |

OTHER PUBLICATIONS

Barnett, et al., Application of Air Bearings to High-Speed Turbomachinery, SAE Technical Paper 700720, Feb. 1, 1970, 10 pages. (Abstract Only).
Agrawal, Foil Air/Gas Bearing Technology—An Overview, ASME 1997 International Gas Turbine and Aeroengine Congress and Exhibition, vol. 1, Jun. 2-5, 1997, 11 Pages.
Zhu et al., Rotordynamic Performance of Flexure Pivot Hydrostatic Gas Bearings for Oil-Free Turbomachinery, Journal of Engineering for Gas Turbines and Power, vol. 129, Issue 4, Jan. 2, 2007, pp. 1020-1027. (Abstract Only).
Echogen Power Systems, $CO_2$ Heat Recovery Cycle (Web Page Only) htpps://www.echogen.com/our-solution/system-overview/.
Wright et al., Operation and Analysis of a Supercritical CO2 Brayton Cycle, Sandia Report, SAND2010-0171, Sandia National Laboratories, Sep. 2010, 101 Pages. http://prod.sandia.gov/techlib/access-control.cgi/2010/100171.pdf.
Bauer, et al., Pathways to cost competitive Csp via sc-CO2 power cycles, Supercritical CO2 Power Cycles Symposium, SunShot, US Department of Energy, Mar. 2016, 21 Pages. http://sco2symposium.com/www2/sco2/papers2016/SystemModeling/119pres.pdf.
Brown, Multiphysics Analysis of Pressurized CO2 Foil Thrust Bearing Characteristics, Knolls Atomic Power Laboratory, Comsol News, 2012, Niskayuna, NY, pp. 58-60. https://www.comsol.com/story/download/157469/Knolls_CN12.pdf.
Iverson, et al., Supercritical CO2 Brayton Cycles for Solar-Thermal Energy, Applied Energy, 2013, pp. 957-970. https://doi.org/10.1016/j.apenergy.2013-06.020.
Wright et al., Overview of Supercritical CO2 Power Cycle Development, Sandia National Laboratories, 2011 University Turbine Systems Research Workshop, Oct. 25-27, 2011, Columbus, OH, 30 Pages. https://www.netl.doe.gov/publications/proceedings/11/utsr/pdf/wed/Wright%20SCO2%20Power%20Cycle%20Summary%20UTSR%202011%20v2a.pdf.
Gjika et al., "Axial Load Control on High-Speed Turbochargers: Test and Prediction", ASME Turbo Expo 2008: Power for Land, Sea, and Air, vol. 01, pp. 705-712, Jun. 9-13, 2008.

* cited by examiner

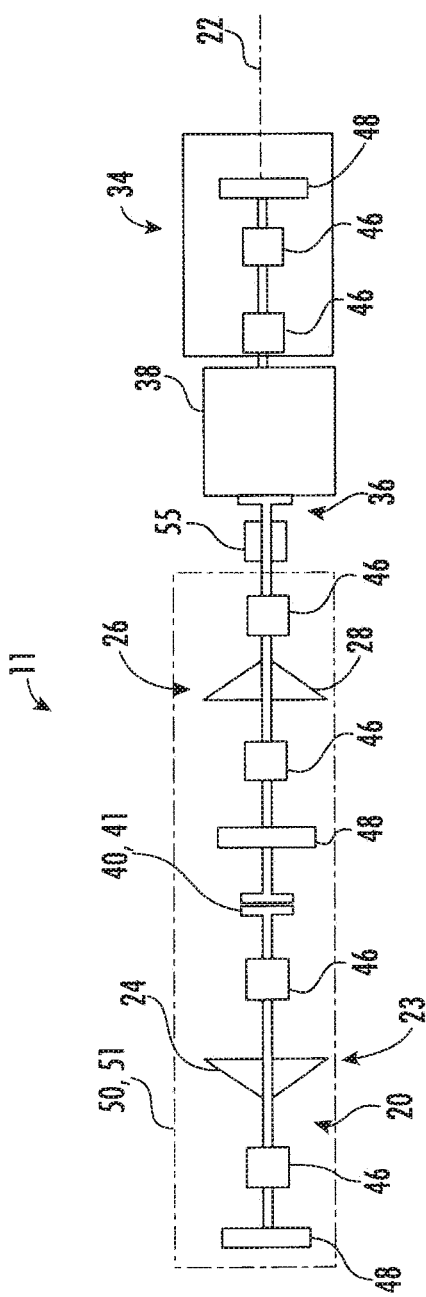
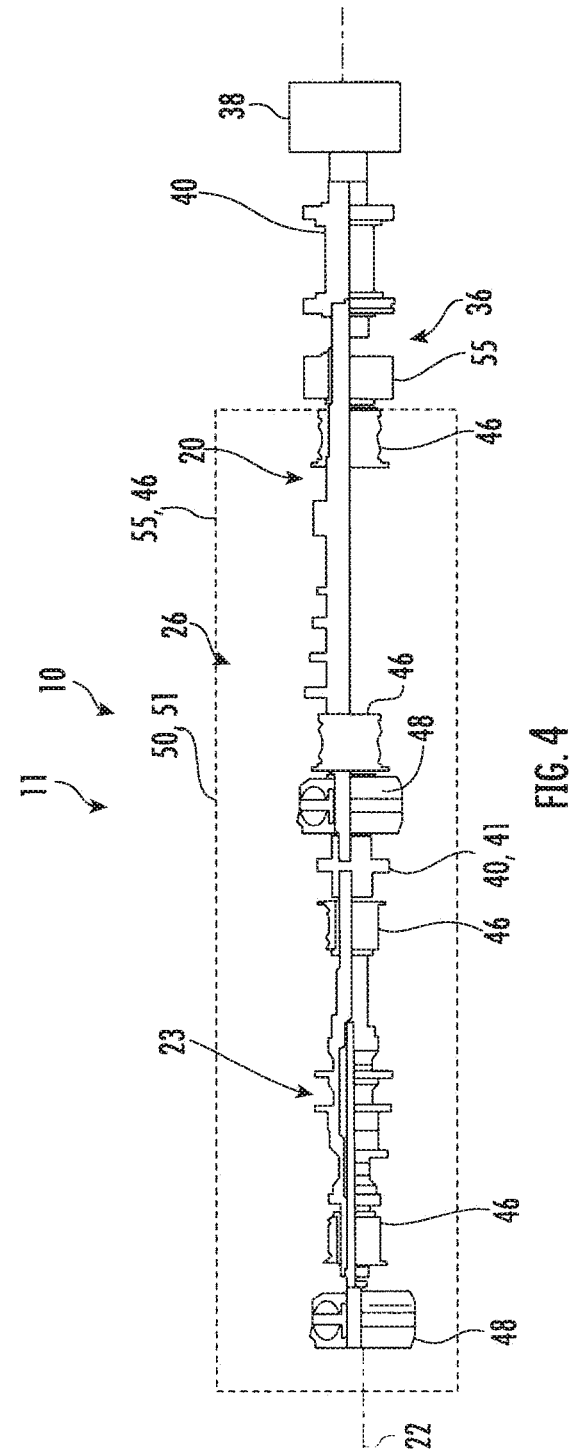

CLOSED CYCLE HEAT ENGINE

FEDERALLY SPONSORED RESEARCH

This invention was made with government support under contract number DE-EE0007109 of the Department of Energy. The government may have certain rights in the invention.

FIELD OF TECHNOLOGY

The present subject matter relates generally to a bearing assembly for a heat engine, or, more particularly, to a bearing assembly that uses the working fluid of the heat engine as the lubricating fluid.

BACKGROUND

Heat engines are used generally in many different systems for the conversion of heat to electricity. For example, in certain embodiments, a heat exchanger of the heat engine may be thermally coupled to an exhaust of a gas turbine engine. In such a manner, the heat engine may capture waste heat from the gas turbine engine and convert such heat to electrical power. In another embodiment, the heat exchanger of a heat engine may be coupled to the heat generation from concentrated solar power systems. In such manner, the heat engine captures solar heat energy and converts such heat to electrical power.

A heat engine generally includes, in serial flow order, a compressor section, a heat exchange section, and an expander section. In operation, the working fluid is provided to the compressor section where one or more compressors progressively compress the fluid until it reaches the heat exchange section. Heat energy is added to the working fluid in the heat exchange section. The working fluid is routed from the heat exchange section to the expander section. The flow of the compressed, heated working fluid through the expander extracts energy from the fluid, driving the expander (which may, in turn, drive the compressor section). The expander is further coupled to an electric generator in order to convert the mechanical energy into electrical energy. The expander is often coupled to the electric generator through the drivetrain or an output shaft. Additionally, the heat engine may generally be a closed heat engine where the working fluid is routed from the expander section back to the compressor section.

A rotating drivetrain of the heat engine (e.g., the compressor section and turbine section) may generally be supported by an oil-lubricated bearing assembly. However, such requires additional pumps, sumps, and dedicated flowpaths, which may increase cost and/or weight of the heat engine. Additionally, the oil-lubricated bearing assembly generates undesired heat at the oil-film clearance due to fluid shear.

Accordingly, a heat engine having a lubrication system utilizing the working fluid as lubrication would be useful. More particularly, a sealing and lubricating system that utilizes a hermetically sealed working fluid for both energy production and lubrication would be welcome in the art.

BRIEF DESCRIPTION

Aspects and advantages will be set forth in part in the following description, or may be obvious from the description, or may be learned through practice of the invention.

In one aspect, the present disclosure is directed to a hermetically sealed heat engine. The heat engine includes a rotating drivetrain and a fluid bearing assembly. The rotating drivetrain includes a compressor section, an expander section, and a heat exchanger. The compressor section and expander section together define at least in part a closed flowpath for the flow of a working fluid. The heat exchanger is thermally coupled to the closed flowpath for adding heat to the working fluid. The fluid bearing assembly is configured to utilize the working fluid to support the rotating drivetrain. Further, the fluid bearing assembly is hermetically sealed with the closed flowpath.

In one embodiment, the fluid bearing assembly includes a fluid bearing and a sealing system. The sealing system may be hermetically sealed with the closed flowpath. In another embodiment, the sealing system includes a containment structure and a lubrication flowpath. The containment structure may define the hermitically sealed portion of the fluid bearing. The lubrication flowpath may supply the containment structure and the fluid bearing with the working fluid. In a further embodiment, the working fluid is a supercritical fluid. Still, in a further embodiment, the supercritical fluid includes supercritical carbon dioxide. In one embodiment, the fluid bearing is a gas radial bearing. The fluid bearing assembly may further include a gas thrust bearing.

In a further embodiment, the heat engine includes a compressor bleed valve at the compressor section. The bleed valve may supply the sealing system with the working fluid. In a different embodiment, the heat engine includes an expander bleed valve at the expander section. The expander bleed valve may supply the sealing system with the working fluid.

In a still further embodiment, the rotating drivetrain includes an output shaft, and the heat includes an electric machine. The electric machine may be drivingly coupled to the output shaft. In an additional embodiment, the heat engine includes a gearbox coupling the output shaft to the electric machine. In another embodiment, the compressor section comprises a compressor and the expander section comprises an expander. The rotating drivetrain may further include a coupling connecting the compressor to the expander. In one embodiment, the coupling is a flexible coupling. In a different embodiment, the coupling is a rigid coupling.

In one embodiment, the heat engine is a waste heat recovery heat engine. The heat exchanger of the heat recovery heat engine may be configured to receive heat from a combustion gas of a gas turbine engine. In another embodiment, the heat engine is a solar power helio-stat field heat engine. The heat exchanger of the solar power helio-sate field heat engine may be configured to receive heat collected by the helio stat field.

In a further embodiment, the heat engine includes a hermetically sealed power drivetrain and a power fluid bearing assembly. The hermetically sealed power drivetrain may include a power expander and an electric machine. The power expander may define at least in part the closed flowpath for the flow of the working fluid. The electric machine may be drivingly coupled to the power expander. The power fluid bearing assembly may be configured to utilize the working fluid to support the power drivetrain. Further, the power fluid bearing assembly may be hermetically sealed with the closed power flowpath.

In another aspect, the present disclosure is directed to a hermetically sealed heat engine for power generation. The heat engine includes a rotating drivetrain and a fluid bearing assembly. The rotating drivetrain includes a compressor section, an expander section, a heat exchanger, an output shaft, and an electric machine. The compressor section and expander section together define at least in part a closed flowpath for the flow of a working fluid. The heat exchanger is thermally coupled to the closed flowpath for adding heat to the working fluid. The electric machine is drivingly coupled to the output shaft. The fluid bearing assembly is configured to support the rotating drivetrain. The fluid bearing assembly includes a fluid bearing and a sealing system. The sealing system is hermetically sealed with the closed flowpath.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which:

FIG. 3 is a schematic drawing of an exemplary drivetrain of a hermetically sealed heat engine coupled to an electric machine via a gearbox according to aspects of the present disclosure;

FIG. 4 is a cross-sectional view of an exemplary drivetrain of a hermetically sealed heat engine coupled to an electric machine via a gearbox according to aspects of the present disclosure;

Figure 1:
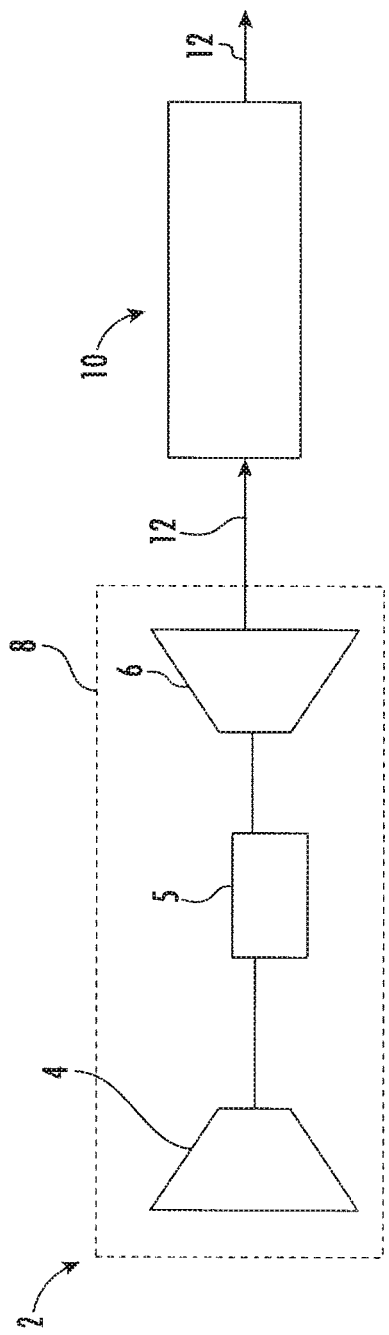
FIG. 1 is a schematic view of an exemplary waste heat recovery system utilizing a heat engine according to aspects of the present disclosure.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

A system is generally provided for a hermetically sealed heat engine. The heat engine includes a rotating drivetrain and a fluid bearing assembly. The drivetrain includes a compressor section, an expander section, and a heat exchanger. For instance, the compressor section and expander section together define at least in part a closed flowpath for the flow of a working fluid. The heat exchanger is thermally coupled to the closed flowpath for adding heat to the working fluid. Further, the fluid bearing assembly is configured to support the rotating drivetrain. More specifically, the fluid bearing assembly includes a fluid bearing and a sealing system. In other embodiments, the fluid bearing system may include a plurality of fluid bearings. Additionally, the sealing system provides working fluid to the fluid bearing (s) from the closed flowpath and from the fluid bearing(s) back to the closed flowpath, such that the fluid bearing assembly is hermetically sealed with the closed flowpath.

In certain embodiments, a hermetically sealed heat engine using a supercritical fluid as the working fluid may be particularly suited to concentrated solar power helio-stat fields or for waste heat recovery in combined-cycle power plants. For example, the unique fluid properties of supercritical fluids, such as supercritical carbon dioxide (sCO2), may enable high power density in the heat engine. For example, a sCO2 heat engine may be capable of generating more energy from relatively low heat input. Further, the hermetically sealed heat engine may be simplified in comparison to a heat engine using oil-lubricated bearings. As such, a hermetically sealed heat engine utilizing the working fluid to lubricate the bearing assembly may provide a less complicated system, reduce costs, and increase efficiency.

Certain embodiments disclosed allow for the number of dry gas seals to be reduced. One embodiment using fluid bearings, such as gas bearings, allows the number of dry gas seals to be reduced to one dry gas seal between a hermetically sealed portion of the engine and a gearbox coupling the turbine to an electric machine. In another embodiment, the expander-compressor driveline, also referred to as a turbocompressor, may be directly coupled to the electric machine (via a coupling) such that the system is a fully-oil free, sealed, heat engine. In such an embodiment, the need for a dry gas seal may be entirely eliminated. This reduction in the number of dry gas seals may allow an axial length of the drivetrain of the heat engine to be shortened and eliminates leakage of the working fluid from the system, removing the requirement for periodic recharging of the working fluid. As such, parasitic losses through flow leakage may be reduced. Further, costs may be reduced due to the removal of the dry gas seals, a relatively expensive component. Additionally, directly coupling the turbocompressor to the generator may eliminate the gearbox, which is a high cost component possessing significant power losses. Still, in another embodiment, the hermetically sealed turbocompressor may be on its own high-speed driveline aerodynamically coupled to a second hermetically sealed driveline containing the primary generator for power generation and an expander section to drive the generator. This embodiment also carries the benefits of dry gas seal and gearbox elimination but additionally possesses benefits to a more efficient compressor section, due to the creation of a higher speed turbocompressor driveline.

It should be appreciated that, although the present subject matter will generally be described herein with reference to a particular heat engine, the disclosed system may generally be used for sealing any hermetically closed heat engine. Further, though the present subject matter will generally be described herein as utilizing a supercritical fluid, such as sCO2, as the working fluid, the disclosed system may generally be used with any other suitable supercritical fluid known in the art and further may be used in other exemplary aspects with any other suitable working fluid (such as a phase changing working fluid, a gas working fluid, a liquid working fluid, etc.).

Referring now to FIG. 1, a schematic view of a waste recovery system utilizing a heat engine is illustrated according to aspects of the present disclosure. As shown, for the depicted embodiment, the waste recovery system includes a gas turbine engine 2. The gas turbine engine 2 generally includes a compressor 4, a combustor 5, and a turbine 6. The gas turbine engine 2 may also include a casing 8 (shown in phantom) housing the components of the gas turbine engine 2. In certain embodiment, the gas turbine engine 2 often produces combustion gas 12 that, even after exiting the turbine 6, is still at a relatively high temperature and must be exhausted from the gas turbine engine 2. For example, the turbine 6 of the gas turbine engine 2 may not be able to extract all of the energy added as heat to the combustion gas 12 in the combustor 5. The hot combustion gas 12 may be pipped through, or otherwise thermally coupled to, a heat engine 10 (as described in more detail below) in order to extract more energy from the combustion gas 12. As such, greater efficiency may be achieved by extracting energy from the combustion gas 12 that may be otherwise exhausted to the atmosphere.

It should be recognized that, in other embodiments, the gas turbine engine 2 and the heat engine 10 may be housed in a single casing 8. Further, it will also be appreciated that the heat engine 10 may be used with any turbomachine that utilizes a heated working fluid, such as the combustion gas 12. For example, the turbomachine may be a land-based turbine turbomachine, a steam turbine turbomachine, a turboshaft turbomachine, and/or a marine turbomachine.

Figure 2:
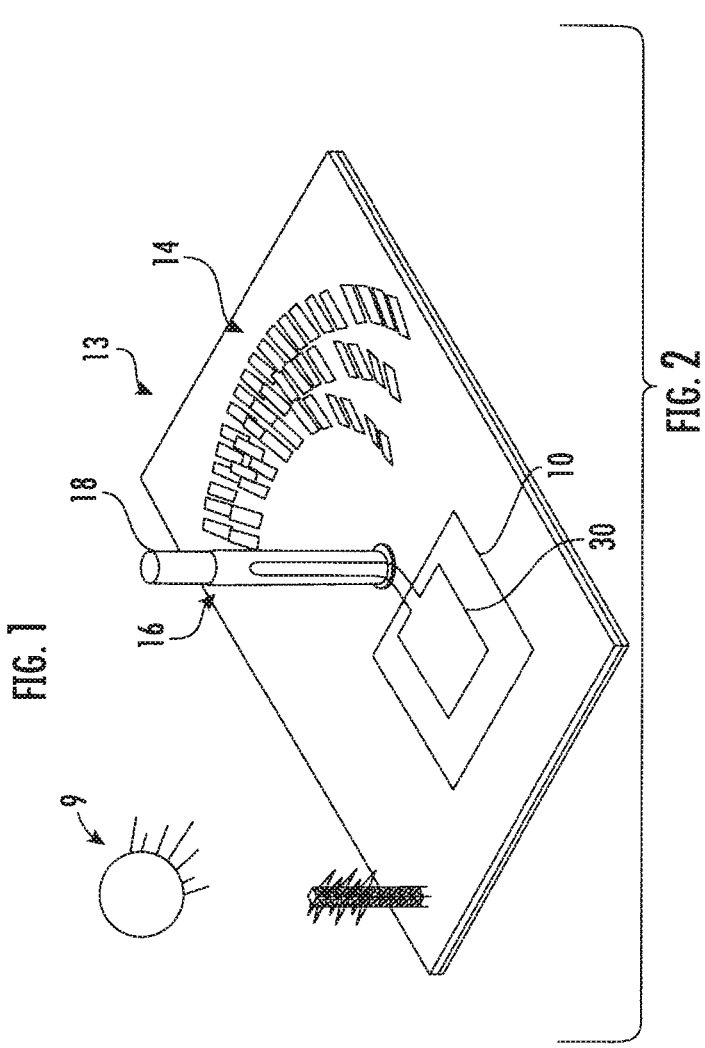
FIG. 2 is a drawing of an exemplary solar power heliostate field utilizing a heat engine according to aspects of the present disclosure.

In other exemplary embodiments, heat engines 10 may be incorporated into other suitable systems. For example, referring now to FIG. 2, a drawing of a solar power helio-stat field 13 is illustrated utilizing a heat engine 10 according to other exemplary aspects of the present disclosure. For the embodiment shown, the helio-stat field 13 includes a plurality of mirrors 14 placed and oriented in order TO direct sunlight 9 to a target location. For example, the helio-stat field 13 includes a heating tower 16 with a focal point 18. The sunlight 9 may be reflected from the mirrors 14 and directed to the focal point 18. As such, the focal point 18 may build up heat. For the embodiment depicted, a working fluid is piped through the heating tower 16 to the focal point 18. Subsequently, the heated working fluid is piped to the heat engine 10 (as described in more detail below). For instance, heat is extracted from the focal point 18 in order to provide the energy necessary to operate the heat engine 10. It should be recognized that the working fluid may be in a closed system such that the same working fluid cooled through extraction of work by the heat engine 10 is provided back through the heating tower 16. As such, for the embodiment shown, a closed flowpath 30 (as described in more detail below) is piped through the heating tower 16 to add energy into the working fluid.

In a different embodiment, the fluid piped through the heating tower 16 may be a heat exchanging fluid. Further, the heating exchanging fluid may be piped though the heat engine 10 and though an internal heat exchanger 32 (see e.g. FIG. 5) to provide energy to the working fluid. Subsequently, the heat exchanging fluid may be piped back through the heat tower 16 in a closed system to extract more solar heat energy.

As will be described in more detail below, a system 11 is provided incorporating a hermetically sealed heat engine 10. The heat engine includes a rotating drivetrain 20 and a fluid bearing assembly 15. The drivetrain 20 includes a compressor section 23, an expander section 26, and a heat exchanger 32. For example, the compressor section 23 and the expander section 26 together define at least in part a closed flowpath 30 for the flow of a working fluid. As used herein, the term "closed flowpath" refers to a flowpath in which the working fluid at one point, such as at the outlet of the expander section 26, is provided back to a previous point in the flowpath, such as the inlet of the compressor section 23. As such, the same working fluid is repeatedly recycled through the heat engine 10. The heat exchanger 32 is thermally coupled to the closed flowpath 30 for adding heat to the working fluid. Further, the fluid bearing assembly 15 is configured to support the rotating drivetrain 20. For example, the fluid bearing assembly 15 includes a fluid bearing and a sealing system 54. More specifically, still, for the embodiments depicted, the fluid bearing is a first fluid bearing of a plurality of fluid bearings of the fluid bearing assembly 15. Additionally, the fluid bearing assembly 15 is hermetically sealed with the closed flowpath 30.

Figure 5:
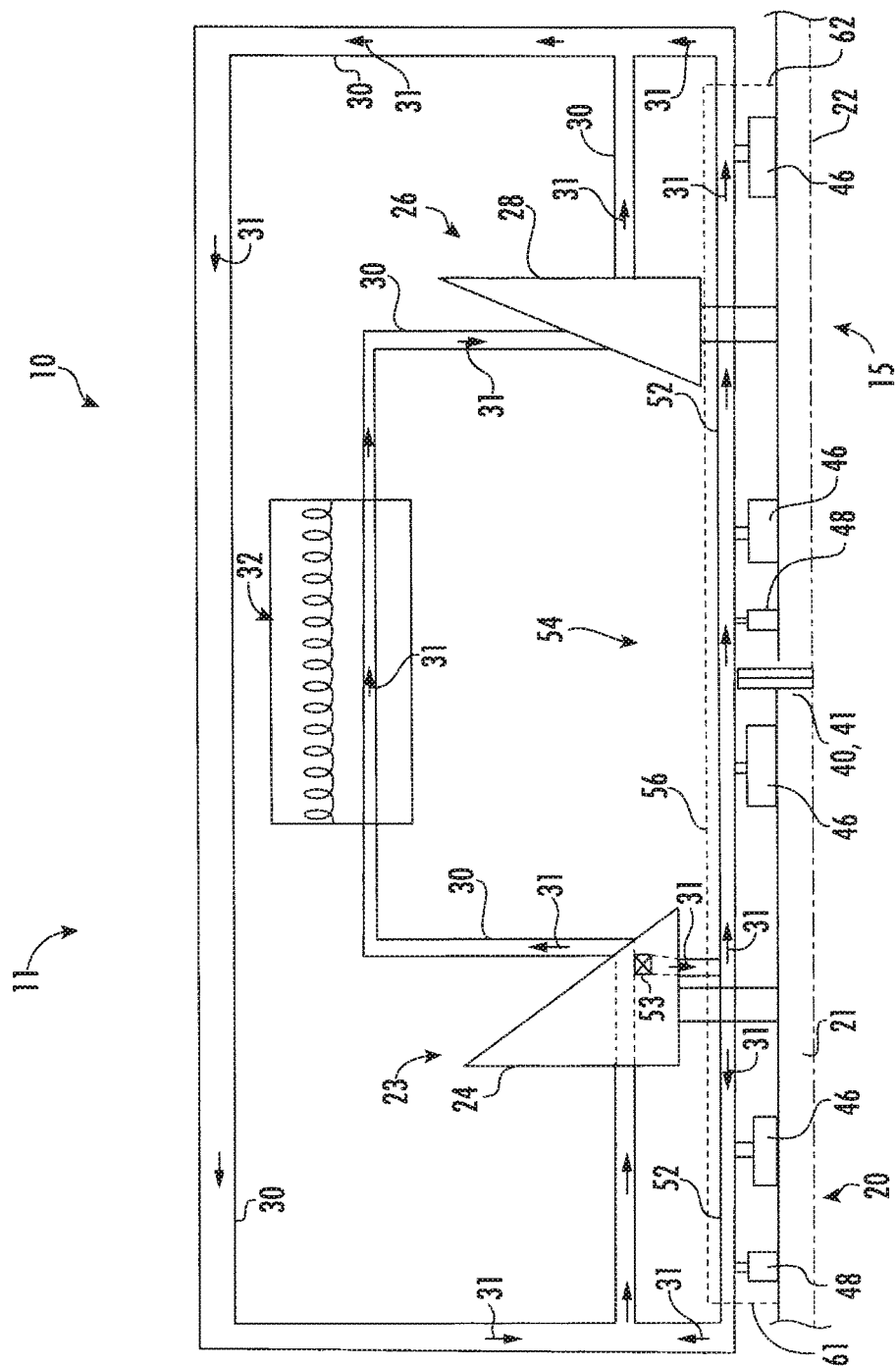
FIG. 5 is a schematic view of a hermetically sealed portion of an exemplary heat engine according to aspects of the present disclosure.
Figure 6:
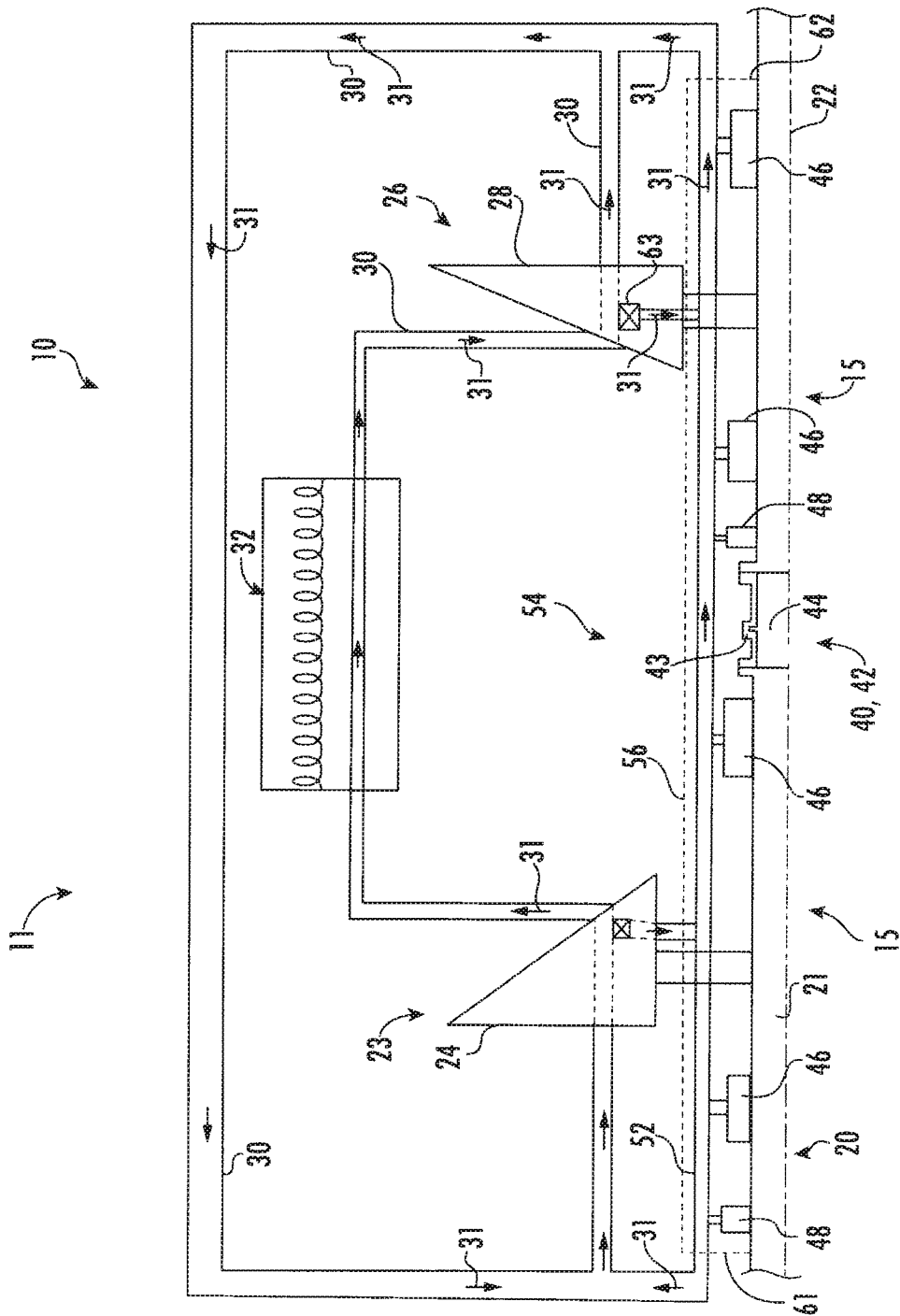
FIG. 6 is a schematic view of a hermetically sealed portion of another exemplary heat engine according to aspects of the present disclosure.

Referring now to FIGS. 3-6, views of a heat engine 10 are illustrated according to aspects of the present disclosure. More particularly, FIG. 3 illustrates a schematic drawing of the drivetrain 20 of a hermetically sealed heat engine 10 coupled to an electric machine 34 via a gearbox 38. FIG. 4 illustrates a cross-section view of the drivetrain of a hermetically sealed heat engine 10 coupled to an electric machine 34 via a gearbox 38. FIG. 5 shows a schematic view of the hermetically sealed portion 50 of a heat engine 10. FIG. 6 shows a schematic view of another embodiment of a hermetically sealed heat engine 10.

Referring now particularly to FIG. 3, the drivetrain 20 of the exemplary heat engine 10 depicted includes an output shaft 36. Further, the heat engine 10 may include an electric machine 34 drivingly coupled to the output shaft 36. For example, the mechanical energy extracted from the working fluid in an expander 28 may be used to drive the electric machine 34. As such, the electric machine 34 may be used for energy production, such as to provide electricity to an electric grid. In such a manner, it will be appreciated that the electric machine 34 may be configured as an electric generator. As such, the electric machine generally includes a rotor section 65 (see FIG. 8) rotatable with the output shaft 36 relative to a stator section 64 (see FIG. 8) in proximity to one another for the production of an electric current. Notably, however, in certain embodiments, the electric machine 34 may further be configured as an electric motor to, e.g., assist in starting the heat engine 10.

Additionally, it should be recognized that that the electric machine 34 may include one or more bearings for supporting the rotor section 65. As shown particularly in FIG. 3, the bearings in the electric machine 34 may be fluid bearings. As such, the fluid bearings may be gas radial bearings 46 and a gas thrust bearing 48 (as shown in FIGS. 10-13 and described in more detail below). Further, in other embodiments, the bearings of the electric machine 34 may be oil-lubricated bearings known in the art.

Further, the exemplary heat engine 10 depicted further includes a gearbox 38 coupling the output shaft 36 to the electric machine 34. As such, the gearbox 38 may be used to change the rotational speed between the rotating drivetrain 20 and the rotor section 65 of the electric machine 34. For example, it may be desirable for the rotor section of the electric machine 34 to move at either a faster or slower speed than the output shaft 36 of the drivetrain 20.

Referring still to FIG. 3, the heat engine 10 contains a hermetically sealed portion 50. For the embodiment depicted, the hermetically sealed portion 50 is approximately airtight from the surrounding environment. As such, the heat engine 10 may include a casing 51 surrounding and enveloping the hermetically sealed portion 50. For instance, the casing 51 may define in part the hermetically sealed portion 50. Further, the hermetically sealed portion 50 is, for the embodiment depicted, bound by one or more dry gas seals 55. In the embodiments of FIGS. 3-4, only one dry gas seal 55 is provided where the heat engine 10 is coupled to an electric machine 34 via a gearbox 38. As such, for the illustrated embodiment, the one dry gas seal 55 is located between the hermetically sealed portion 50 and the gearbox 38. It will be appreciated that a "dry gas seal" is generally a non-contacting, dry-running mechanical face seal. For example, the dry gas seal 55 may include a rotating ring and a stationary ring that generate a fluid-dynamic lifting force to create a gap seal. It will also be appreciated that, in other exemplary embodiments, the heat engine 10 may include any other suitable number and/or configuration of seals to define the hermetically sealed portion 50.

In the exemplary embodiment, the hermetically sealed heat engine 10 includes the rotating drivetrain 20 defining a centerline 22 extending along a length of the heat engine 10. For the embodiment shown, the drivetrain 20 includes the compressor section 23 that includes a compressor 24. In the embodiment shown, the compressor 24 is an axial compressor. In certain embodiments, the compressor 24 may be a centrifugal compressor. Further, in the illustrated embodiment, the drivetrain 20 includes an expander section 26 that includes an expander 28. In certain embodiments the expander 28 may be a turbine.

Referring now particularly to the embodiment of FIG. 5, the compressor section 23 and expander section 26 together define at least in part the closed flowpath 30 for the flow of a working fluid (depicted schematically using arrows 31). Further, for the exemplary embodiment, the heat exchanger 32 is thermally coupled to the closed flowpath 30 for adding heat to the working fluid. For example, the working fluid may be progressively compressed while traveling through the compressor 24. In the shown embodiment, energy in the form of heat is added to the working fluid at the heat exchanger 32. For the embodiment depicted, the heat exchanger 32 is located downstream of the compressor section 23 and upstream of the expander section 26. It should be appreciated, however, that in other embodiments the heat exchanger 32 may be placed anywhere in the closed flowpath 30. It should be recognized that the heat added in the heat exchanger 32 may come from any heat source. For example, the heat source may be a heat recovery system such as the hot combustion gas 12 as shown in FIG. 1. In other embodiments, the heat source may be solar energy such as energy from the helio-stat field 13 of FIG. 2. Still, in other embodiments, the heat source may be geothermal, nuclear, combustion, or any other heat source.

For the exemplary embodiment, energy is then extracted from the working fluid in the expander 28 as mechanical energy. As such, for the illustrated embodiment, the energy extracted in the expander 28 is used to both drive the compressor 24 and an electric machine 34 (as shown in FIG. 3 and described in more detail below). For example, a shaft 21 of the drivetrain 20 mechanically couples the expander 28 to both the compressor 24 and the electric machine 34. It should be recognized that in other embodiments the heat engine 10 may include additional compressors 24 or expanders 28 in the closed flowpath 30. As described above with reference to FIGS. 3-4, for the depicted embodiment, the heat engine 10 is hermetically sealed and the flowpath is a closed flowpath 30. As such, for the illustrated embodiment, the working fluid is piped from the expander section 26 back to the compressor section 23 via the closed flowpath 30.

Further, the working fluid in the closed flowpath 30 may be a supercritical fluid. For example, the working fluid may be supercritical carbon dioxide. In other embodiments, the working fluid may be any other supercritical fluid known in the art. For instance, the supercritical fluid may be supercritical water (sH2O).

Referring still to FIG. 5 and also to FIG. 4, for the shown embodiment, the rotating drivetrain 20 includes a coupling 40 attaching the compressor section 23 and the expander section 26. For example, the coupling 40 may couple the compressor 24 to the expander 28. For the embodiment depicted, the coupling 40 is a rigid coupling 41. As such, the rigid coupling 41 may reduce an axial length of the drivetrain 20. Further, the fluid bearing assembly 15 (as described in more detail below) may allow for the use of a rigid coupling 41, as the fluid bearing assembly 15 may ensure the two portion of the shaft 21, coupled via the rigid coupling 41, remain aligned.

Referring now particularly to FIG. 4, the use of a rigid coupling 41 may allow for the use one gas thrust bearing 48 in the fluid bearing assembly 15 instead of multiple gas thrust bearings 48 that may be required with a flexible coupling 42. Further, the heat engine 10 may include a coupling 40 connecting the output shaft 36 to the gearbox 38. As such, this coupling 40 may be a flexible coupling 42 or a rigid coupling 41.

Referring still to FIGS. 4 & 5, for the depicted embodiment, the heat engine 10 includes the fluid bearing assembly 15. In the illustrated embodiment, the fluid bearing assembly 15 is configured to support the rotating drivetrain 20. For example, the fluid bearing assembly 15 may include at least one fluid bearing and a sealing system 54. For the embodiment depicted, the fluid bearing assembly 15 includes a plurality of fluid bearings, such as two or more, the plurality of fluid bearings including at least one gas radial bearing 46, or rather a plurality of gas radial bearings 46, and at least one gas thrust bearing 48. For the illustrated embodiment, the gas radial bearings 46 support the drivetrain 20 from radial loads approximately perpendicular relative to the centerline 22. Similarly, in the exemplary embodiment, the gas thrust bearing 48 supports the drivetrain 20 axially from loads approximately parallel to the centerline 22.

As shown, for the embodiment depicted, the compressor 24 is bounded by gas radial bearings 46 both forward and aft of the compressor 24 along the centerline 22. The term "forward," as used herein, generally refers to the upstream direction of the working fluid in the closed flowpath 30 between the compressor section 23 and the expander section 26 (as represented by arrows 31). For example, forward as illustrated in FIGS. 3-8 is depicted as to the left. The term "aft," as used herein, generally refers to the downstream direction of the working fluid in the closed flowpath 30 between the compressor section 23 and the expander section 26 (as represented by arrows 31). For example, aft as illustrated in FIGS. 3-8 is depicted to the right. Similarly, for the shown embodiment, the expander 28 is also bounded by radial bearings 46 both forward and aft of the expander 28 along the centerline 22. As such, the drivetrain 20 is, for the embodiment shown, supported by four or more gas radial bearings 46. It will be appreciated, however, that in other exemplary embodiments, the heat engine 10 may include any other suitable number of gas radial bearings 46, such as at least two and less than ten.

Bounding the compressor 24 and the expander 28 on each side with gas radial bearings 46 may prevent undesirable torques and moments on the drivetrain 20. As noted above, for the illustrated embodiment, the fluid bearing assembly 15 additionally includes at least one gas thrust bearing 48 along the length of the drivetrain 20. For instance, for the embodiment of FIG. 5, there is a gas thrust bearing 48 in each of the compressor section 23 and the expander section 46. It will be appreciated, however, that in other embodiments also utilizing a rigid coupling 41, there may be only one thrust bearing 48 to support the axial loads on the drivetrain 20. As shown particularly in FIG. 6, the coupling 40 may be a flexible coupling 42. Flexible couplings 42 may allow for operation of the heat engine 10 when the compressor section 23 and the expander section 26 are in angular misalignment, lateral misalignment, or both. For example, the flexible coupling 42 may include an internal structure 44 to transfer rotation energy between the expander section 26 and the compressor section 23. Further, the flexible coupling 42 may include an external bellow structure 43 to compensate for angular and/or lateral misalignments. For example, the external bellow structure may include one or more bellows allowing the flexible coupling 42 to stretch and accommodate misalignments. It should be recognized that other embodiments may use any arrangement or number of gas radial bearings 46 and gas thrust bearings 48. For example, adjacent radial and gas thrust bearings 46, 48 may be reversed for other design considerations.

Referring still to FIG. 5, for the depicted embodiment, the bearing assembly includes the sealing system 54. In the embodiment depicted, the sealing system 54 is hermetically sealed with the closed flowpath 30. For example, the sealing system 54 surrounds the fluid bearings to contain the working fluid provided to the fluid bearings, and return such working fluid to the closed flowpath 30. As is depicted schematically for the exemplary embodiment, the sealing system 54 includes a containment structure 56 (shown schematically in phantom surrounding the fluid bearings) and a lubrication flowpath 52. As such, for the depicted embodiment, the sealing system 54 is used to provide the fluid bearings (such as the gas radial bearing 46 of FIGS. 10-11 and the gas thrust bearing 48 of FIGS. 12-13) with the working fluid. For example, the sealing system 54 includes a lubrication flowpath 52 for suppling the fluid bearings with lubrication. Generally, the working fluid can be bled off of the closed flowpath 30 to provide lubrication to the gas radial bearings 46 or the gas thrust bearings 48.

Figure 14:
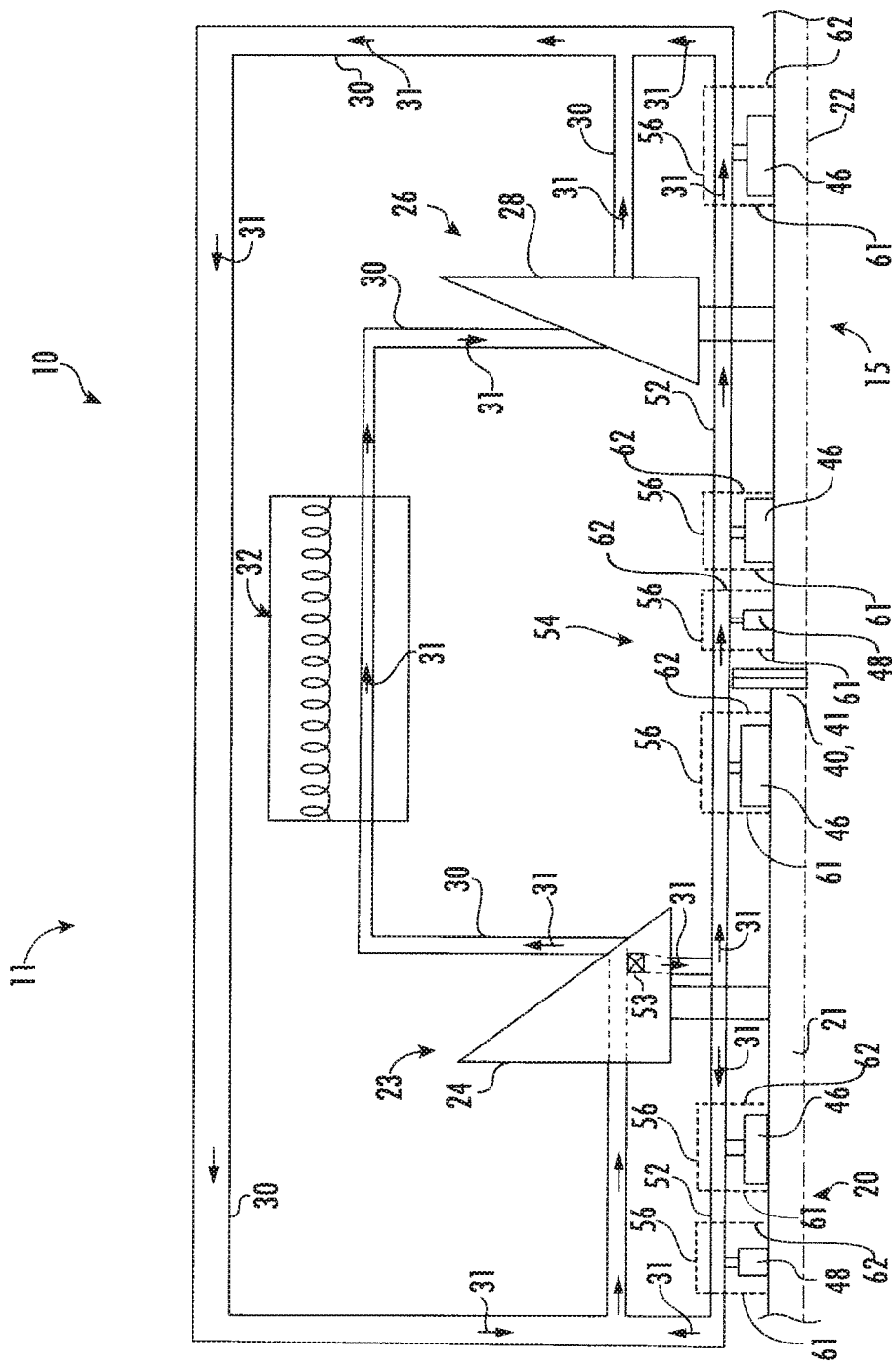
FIG. 14 is a schematic view of a hermetically sealed portion of an exemplary heat engine according to aspects of the present disclosure, the hermetically sealed portion including a plurality of individual containment structures.

As shown particularly in FIG. 5, the working fluid may be bled from the compressor section 23 of the closed flowpath 30 to supply the lubrication flowpath 52 with the working fluid. For example, the working fluid may be bled from the compressor 24 using a compressor bleed valve 53. As such, for the embodiment shown, the working fluid is subsequently piped through each fluid bearing both upstream and downstream. For the illustrated embodiment, after supplying lubrication to the fluid bearings, the working fluid is collected by the containment structure 56 and returned to the lubrication flowpath 52 and subsequently to the closed flowpath 30 for the working fluid. In such a manner, the containment structure 56 is fluidly connected to the closed flowpath 30. In another embodiment, the working fluid may be returned to the closed flowpath 30 directly from the containments structure 56. Notably, the containment structure 56 includes a forward seal 61 and an aft seal 62 to form a seal with the rotating shaft 21. It will be appreciated that any suitable containment structure 56 may be provided. For example, in other embodiments, as shown in FIG. 14, a plurality of individual containment structures 56 may be provided, one for each fluid bearing.

As shown particularly in FIG. 6, the working fluid may be bled from the expander section 26 of the closed flowpath 30 to supply the lubrication flowpath 52 with the working fluid. For example, the working fluid may be bled from the expander 28 using an expander bleed valve 63. As such, for the illustrated embodiment, the working fluid is subsequently piped through each fluid bearing both upstream and downstream.

It should be recognized that the lubrication flowpath 52 may sequentially supply the working fluid to each fluid bearing as shown in FIGS. 5-6. In other embodiments, a separate pipe of the lubrication flowpath 52 may supply each fluid bearing with the working fluid before the fluid is returned to the closed flowpath 30. Further, in the illustrated embodiment, it should be recognized that the hermetically sealed portion 50, as shown in FIGS. 3-4, includes the closed flowpath 30, the containment structure 56, the lubrication flowpath 52, and the fluid bearings.

Figure 7:
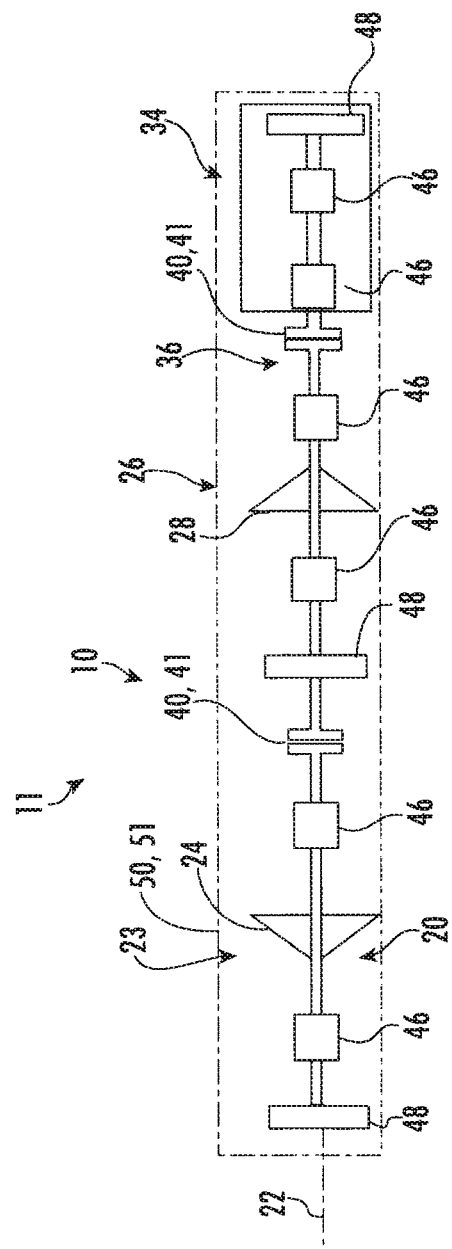
FIG. 7 is a schematic view of an exemplary hermetically sealed heat engine including an electric machine within a hermetically sealed portion according to aspects of the present disclosure.
Figure 8:
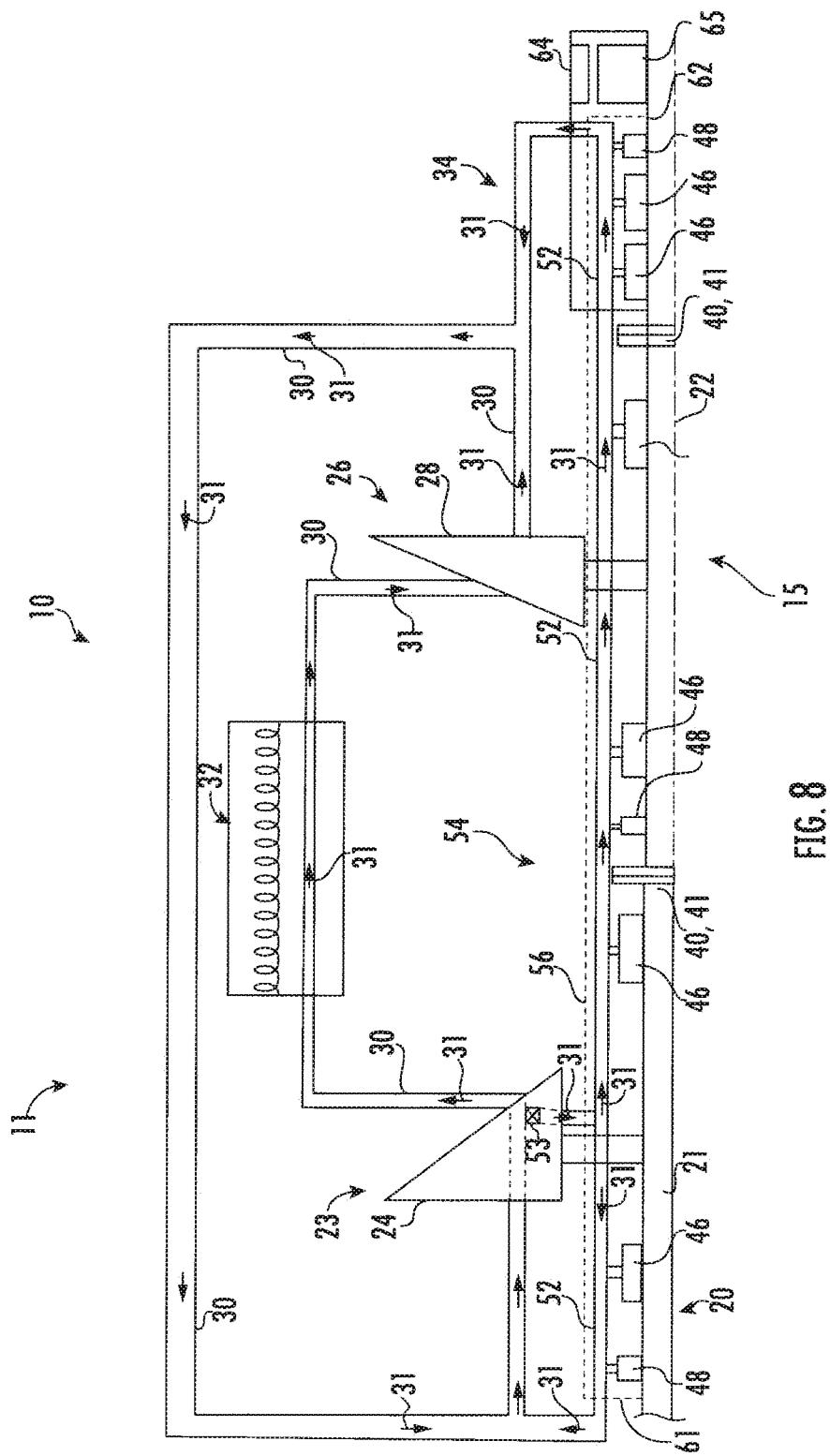
FIG. 8 is a schematic view of a hermitically sealed portion of the heat engine of FIG. 7 according to aspects of the present disclosure.

Referring now to FIGS. 7-8, FIG. 7 illustrates a schematic view of another embodiment of a heat engine 10 in accordance with the present disclosure with the electric machine 34 housed within the hermetically sealed portion 50. FIG. 8 illustrates a schematic view of the hermetically sealed portion of the heat engine of FIG. 7. The exemplary heat engine 10 of FIG. 7-8 may be configured in generally the same manner as the exemplary heat engine of FIGS. 3-5. For example, the heat engine 10 includes a drivetrain 20. Further, for the embodiment shown, the rotating drivetrain 20 includes an output shaft 36 and an electric machine 34 drivingly coupled to the output shaft 36. Further, a fluid bearing assembly 15 may include fluid bearings housed within the electric machine 34, such as gas radial bearings 46 gas thrust bearing 48. As such, the sealing system 54 may supply the fluid bearings of the electric machine 34 with the working fluid. For instance, the working fluid may be used to lubricate the fluid bearings of the electric machine 34. For example, the working fluid may be piped using the lubrication flowpath 52 to a gas radial bearing 46 and a gas thrust bearing 48 in, or otherwise directly supporting, the electric machine 34. Further, for the embodiment shown, the working fluid is collected by a containment structure 56 and returned back to the closed flowpath 30 after lubricating the fluid bearings. For example, the working fluid may be returned to the closed flowpath 30 via the lubrication flowpath 52. The containment structure 56 may be configured in generally the same manner as the containment structure of FIGS. 6-7.

As shown, for the illustrated embodiment, the output shaft 36 is coupled to the electric machine 34 using a coupling 40. The coupling 40 is, for the embodiment shown, a rigid coupling as described in FIGS. 3-5. In another embodiment, however, the coupling of between the output shaft 36 and the electric machine 34 may instead be a flexible coupling 42 as described in FIG. 6. Referring particularly to FIG. 8, the heat engine 10 includes, for the depicted embodiment, a rotor section 65 and a stator section 64 in proximity to one another for the production of an electric current.

Figure 9:
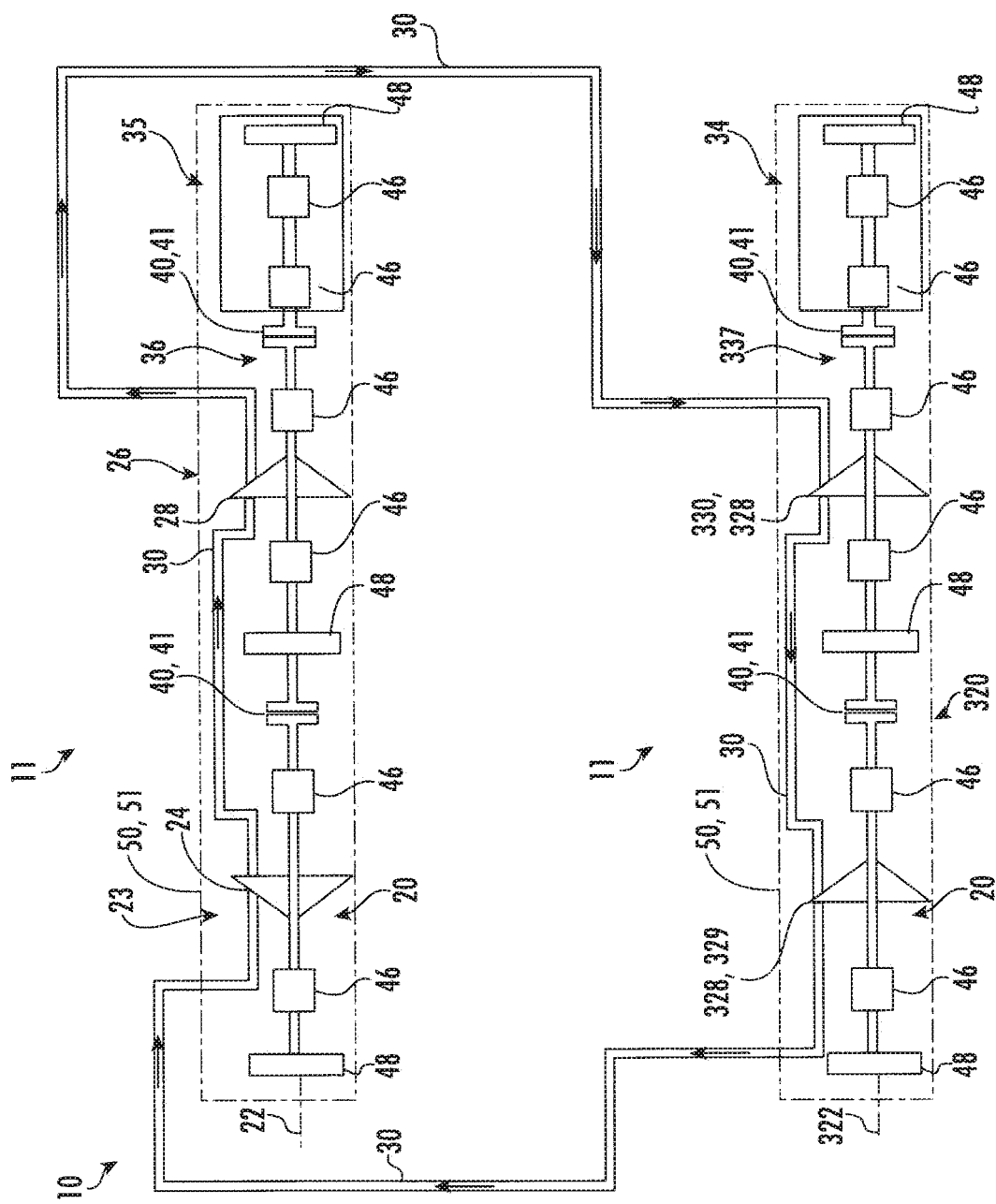
FIG. 9 is a schematic view of another embodiment of a heat engine in accordance with the present disclosure with a fluidly coupled power drivetrain.

Referring now to FIG. 9, a schematic view of another embodiment of a heat engine 10 in accordance with the present disclosure with a fluidly coupled power drivetrain 320. In the depicted embodiment, the heat engine 10 includes an electric starter 35 coupled to an input shaft 336. For example, the electric starter 35 may receive an electric current to drive a rotor portion of the electric starter to rotate relative to a stator portion. Further, for the embodiment shown, the electric starter 35 is coupled to the input shaft 336 via a rigid coupling 41. It should be recognized that, in a further embodiment, the coupling 40 may be a flexible coupling 42 (see e.g. FIG. 6). As such, for the embodiment shown, the electric starter 35 starts rotation of the drivetrain 20. The drivetrain 20 may generally be configured as the drivetrain of FIGS. 3-8. Further, for the embodiment shown, the heat engine includes the fluid bearing assembly as described with reference to FIGS. 7-8 for supporting the drivetrain 20 and the electric starter 35. For example, the drivetrain 20 and electric starter 35 may include a plurality of fluid bearings, such as gas radial bearings 46 and a gas thrust bearings 48, hermitically sealed with the closed flowpath 30 via a lubrication flowpath 52 of a sealing system 54.

In the embodiment shown, the closed flowpath 30 is in fluid communication with the power drivetrain 320 defining a power centerline 322. For example, the working fluid may be supplied to the power drivetrain 320 via the closed flowpath 30. Further, for the embodiment shown, the closed flowpath 30 is at least partially defined by a power expander 328. For example, the closed flowpath 30 may be partially defined by a plurality of power expanders 328, such as a first power expander 330 and a second power expander 329. For the embodiment shown, energy added to the working fluid in the heat exchanger 32 (see e.g. FIGS. 5-6) is only partially extracted by the expander 28. For instance, the expander 28 may generally only extract enough energy to operate the compressor 24. Subsequently, for the embodiment shown, the working fluid is piped via the closed flowpath 30 to the power drivetrain 310 where additional energy is extracted by the power expander 328. For example, the working fluid may flow through the first power expander 330 where a portion of the energy of the working fluid is extracted. Subsequently, the working fluid may be piped through the second power expander 329 where more energy is extracted from working fluid. Further, the working fluid may then be piped back to the drivetrain 20, thereby completing the closed flowpath 30.

Further, energy extracted from the working fluid may be used to rotate the power drivetrain 320. The power drivetrain 320 of the exemplary heat engine 10 depicted includes a power output shaft 337. Further, the heat engine 10 may include an electric machine 34 drivingly coupled to the power output shaft 337. For example, the mechanical energy extracted from the working fluid in the one or more power expanders 328 (e.g. the first power expander 330 and the second power expander 329) may be used to drive the electric machine 34. As such, for the embodiment depicted, the electric machine 34 is drivingly coupled to one or more power expanders 328. In the embodiment depicted, the electric machine is coupled to the power expanders using a rigid coupling 41. In other embodiments, it should be recognized that the coupling 40 may be a flexible coupling 42 (see. e.g. FIG. 6).

The electric machine 34 may be used for energy production, such as to provide electricity to an electric grid. In such a manner, it will be appreciated that the electric machine 34 may be configured as an electric generator. As such, the electric machine generally includes a rotor section 65 (see FIG. 8) rotatable with the output shaft 36 relative to a stator section 64 (see FIG. 8) in proximity to one another for the production of an electric current. Further, it should be recognized, that a separate power drivetrain 320 and drivetrain 20 may allow for different rotation speeds suitable for power generation and compression of the working fluid respectively.

Further, for the embodiment of FIG. 9, the power drivetrain may include a power fluid bearing assembly generally as described with reference to the fluid bearing assembly of FIG. 8 for supporting the power drivetrain 320 and the electric machine 34. For example, the drivetrain 20 and electric machine 34 may include a plurality of fluid bearings, such as gas radial bearings 46 and gas thrust bearing 48, hermitically sealed with the closed flowpath 30 via a lubrication flowpath 52 of a sealing system 54.

Figure 10:
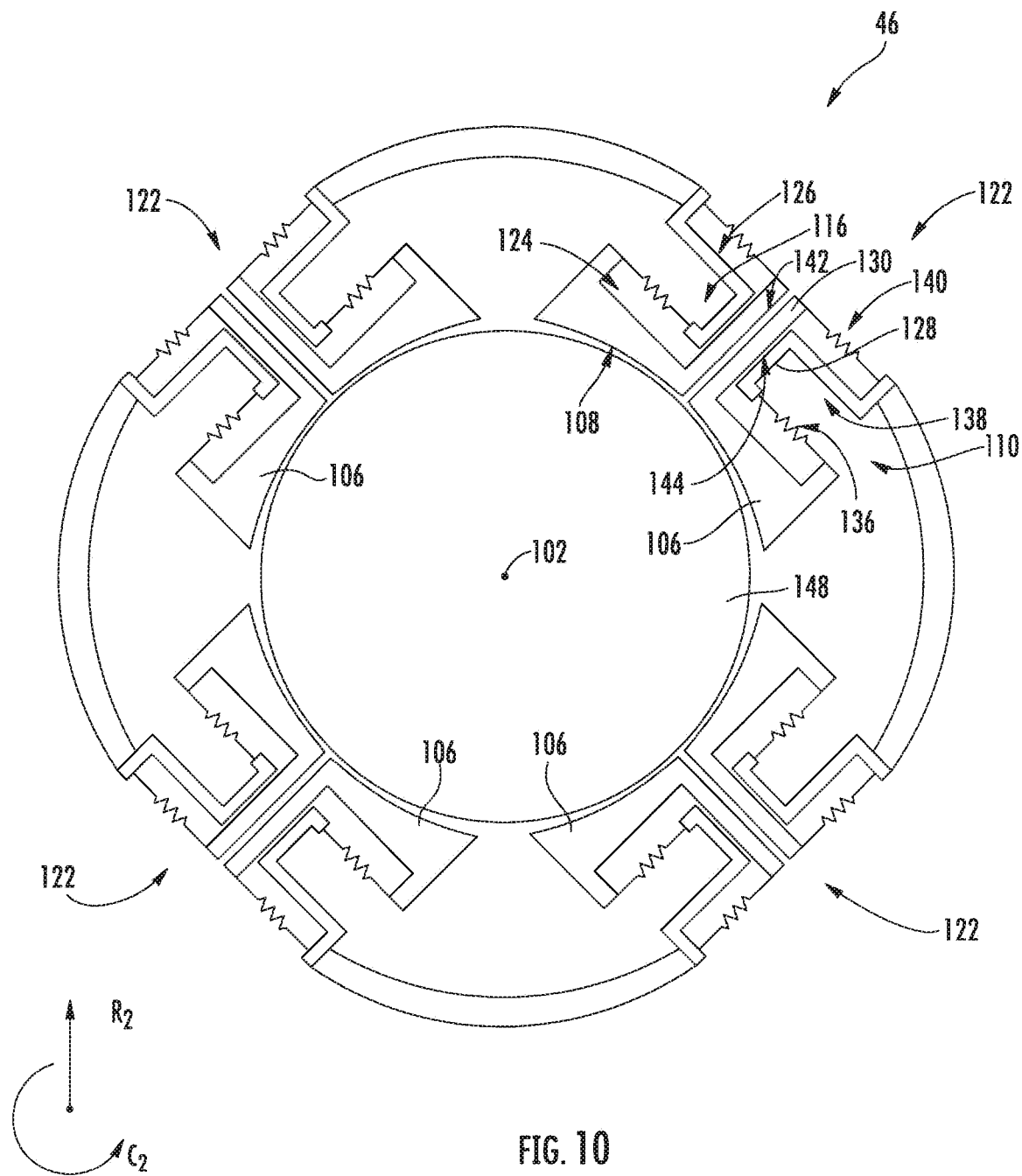
FIG. 10 is a cross-sectional, schematic view of an exemplary gas radial bearing according to aspects of the present disclosure.
Figure 11:
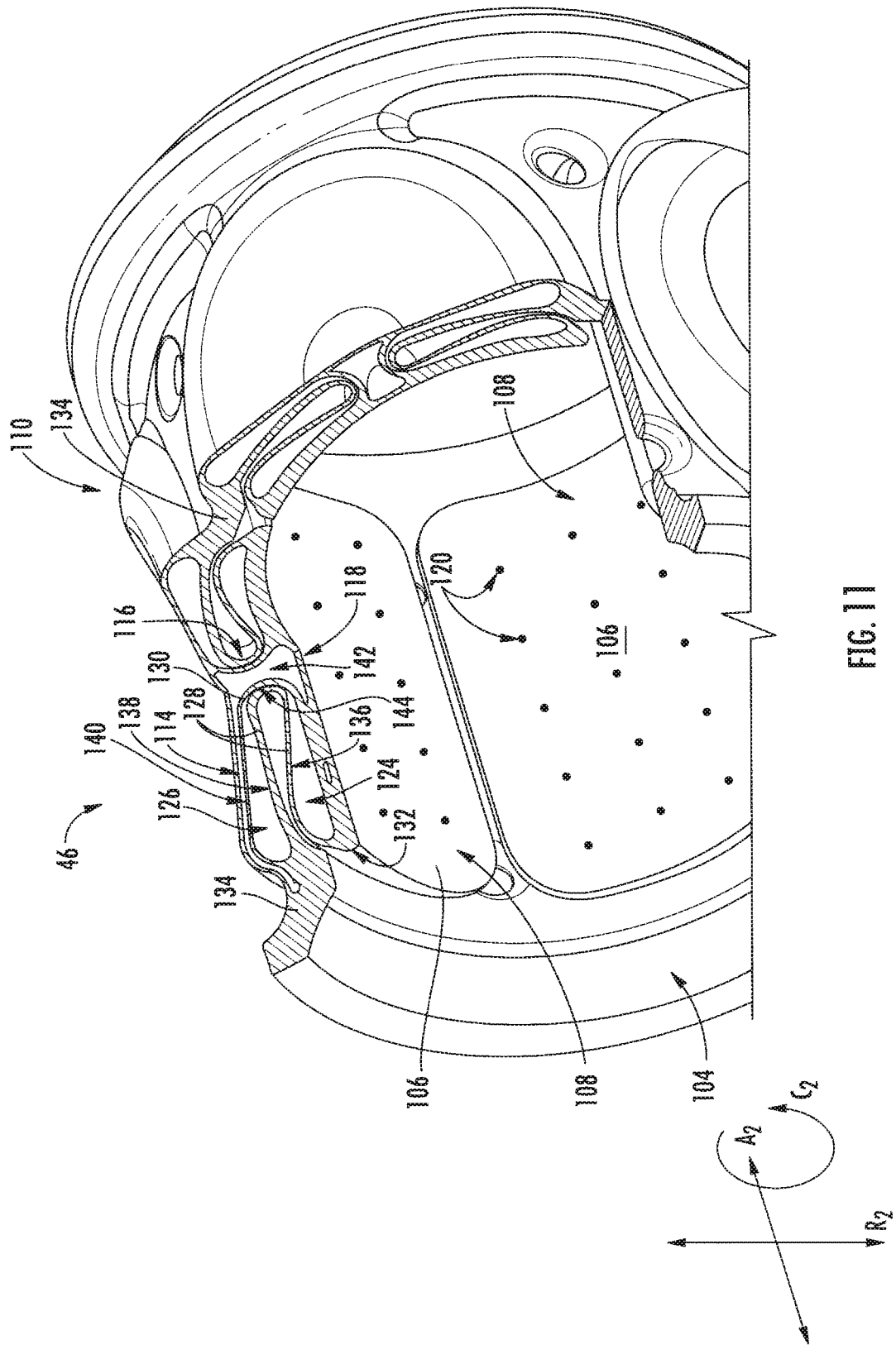
FIG. 11 is a view of one embodiment of a gas radial bearing according to aspects of the present disclosure.

Referring now to FIGS. 10-11, views of a gas radial bearing 46 are illustrated in accordance to aspects of the present disclosure as may be incorporated into the exemplary bearing assemblies described with respect to FIGS. 3-8. More particularly, FIG. 10 shows a cross-sectional, schematic view of a gas radial bearing 46. FIG. 11 shows a view of an exemplary gas radial bearing 46. It should be recognized that any other gas radial bearing 46 or other fluid bearing known in the art may be used to support the drivetrain 20. Further, the exemplary gas radial bearing 46 is provided for example only and is not limiting on the invention.

As shown, the exemplary gas radial bearing 46 depicted generally defines an axial direction A2 (and a central axis 102 extending generally along the axial direction A2), a radial direction R2, and a circumferential direction C2. For the embodiment depicted, the gas radial bearing 46 defines an axial opening 104 and is configured to support a rotary component, e.g., of the drivetrain 20, within the axial opening 104. The gas bearing 46 generally includes one or more bearing pads 106, each defining an inner surface 108 for supporting the rotary component and a housing 110 attached to or formed integrally with the bearing pad 106. The gas radial bearing 46 may be configured as a gas or "air" bearing, or oil-free/oil-less bearing, and accordingly the housing 110 is generally configured to provide the inner surfaces 108 of the one or more bearing pads 106 with a flow of a working fluid (e.g., air, compressed air and combustion gases, or the like) during operation to create separation with the rotary component and provide a low friction means for supporting such rotary component (not depicted). For example, the air bearing may utilize the sCO2 or another supercritical working fluid utilized in the closed flowpath 30 described above with respect to FIGS. 3-8.

For the exemplary embodiment illustrated, the housing 110 of the gas radial bearing 46 includes a supply channel 114 extending to a column 116. The column 116 may be configured to provide the bearing pad 106 with a flow of the working fluid from the supply channel 114, as will be discussed in greater detail below. More particularly, the supply channel 114 may receive a flow of pressurized working fluid from one or more of the compressor 24 or expander 28. Additionally, as is depicted in the exemplary embodiment, the column 116 extends towards the bearing pad 106 and supports the bearing pad 106. For the embodiment depicted, the column 116 fully supports the bearing pad 106. Further, for the embodiment depicted, the column 116 is located approximately at a center of the bearing pad 106. More particularly, the bearing pad 106 depicted defines a center 118 along the axial direction A2 and along the circumferential direction C2, and the column 116 is at least partially attached to or formed integrally with the bearing pad 106 proximate the center 118 of the bearing pad 106. However, in other embodiments, the column 116 may instead be positioned off-center from the bearing pad 106.

In certain embodiments, the bearing pad 106 may be configured to disperse and/or diffuse the working fluid to support and/or lubricate the rotary component during operation of the gas radial bearing 46. In such manner, the gas radial bearing 46 may provide a hydrostatically pressurized compliant bearing pad. For example, the exemplary bearing pad 106 depicted includes a plurality of gas distribution holes 120 disposed across the bearing pad 106 to provide an evenly distributed pressure field within the axial opening 104 for supporting and/or lubricating the rotary component.

The plurality of gas distribution holes 120 may be configured having any dimensions or arrangements (e.g., array, pattern or configuration) suitable to function as described herein. In some embodiments, each bearing pad 106 may have a sufficiently high gas permeability to permit the working fluid received from the column 116 to generate sufficient pressure within axial opening 104 to provide the support and/or lubrication of the rotary component.

Furthermore, as is depicted in the exemplary embodiment, the gas radial bearing 46 includes a plurality of sections 122 spaced along the circumferential direction C2 of the gas radial bearing 46. Each section 122 may generally include a bearing pad 106 (e.g., configured in the same manner described above) and a respective portion of the housing 110 configured as a damper assembly. Accordingly, for the embodiment shown, the gas radial bearing 46 includes a plurality of bearing pads 106 substantially evenly spaced along the circumferential direction C2. For the shown embodiment, each of the bearing pads 106 defines a respective inner surface 108, the inner surfaces 108 of the plurality of bearing pads 106 together defining a substantially annular support surface along the circumferential direction C2 and a linear support surface along the axial direction A2 for supporting a rotary component.

Moreover, in some embodiments, the bearing pad 106 and housing 110 of each section 122 may be formed integrally of a single, continuous material. For example, in some embodiments, each of the bearing pads 106 may be formed integrally with the housing 110 of the respective section 122 of the gas radial bearing 46, such that the bearing pad 106 and housing 110 of the respective section 122 are fabricated to form a single integral part. Moreover, in certain embodiments, a plurality of bearing pads 106 and respective portions of the housing 110 forming two or more sections 122 may be formed integrally, or further still, each of the plurality of bearing pads 106 and respective portions of the housing 110 forming the gas radial bearing 46 may be formed integrally.

As briefly noted above, each of the bearing sections 122 may include a portion of the housing 110 configured as a damper assembly. More particularly, for the embodiment depicted, the housing 110 at least partially defines a first fluid damper cavity 124 and a second fluid damper cavity 126. For the embodiment depicted, the first fluid damper cavity 124 and the second fluid damper cavity 126 each extend three hundred and sixty degrees (360) around the column 116. Additionally, the first fluid damper cavity 124 may be positioned adjacent to the bearing pad 106, and the second fluid damper cavity 126 may be spaced from the first fluid damper cavity 124, or more particularly, is spaced from the first fluid damper cavity 124 along the radial direction R2.

For the embodiment depicted, the portion of the housing 110 configured as a damper assembly for each bearing section 122 generally includes a first, outer wall 128 and a second, inner wall 130. The inner wall 130 and outer wall 128, for the embodiment depicted, are configured as a serpentine inner wall 130 and a serpentine outer wall 128 (i.e., a wall extending in a variety of directions), respectively. For example, the bearing pad 106 generally defines an outer periphery 132. For the illustrated embodiment, the serpentine outer wall 128 is attached to or formed integrally with the bearing pad 106 proximate the outer periphery 132 of the bearing pad 106 (or rather, at the outer periphery 132 of the bearing pad 106), extends generally towards the center 118 of the bearing pad 106 along the axial direction A2, and subsequently extends back away from the center 118 of the bearing pad 106 along the axial direction A2, connecting with a body 134 of the housing 110. Similarly, for the embodiment depicted, the inner wall 130 is attached to or formed integrally with the bearing pad 106 proximate the center 118 of the bearing pad 106 (or rather, at the center 118 of the bearing pad 106), extends generally away from the bearing pad 106 along the radial direction R2, and subsequently extends away from the center 118 of the bearing pad 106 along the axial direction A2, also connecting with the body 134 of the housing 110.

Further, the outer wall 128 generally includes a semi-rigid portion 136 and a rigid portion 138, and similarly the inner wall 130 includes a semi-rigid portion 140. As is depicted for the exemplary embodiment, the outer wall 128 at least partially defines the first fluid damper cavity 124 and at least partially defines the second fluid damper cavity 126. Additionally, the bearing pad 106 may at least partially define the first fluid damper cavity 124, and the inner wall 130 may at least partially define the second fluid damper cavity 126. More particularly, for the embodiment depicted, the semi-rigid portion 136 of the outer wall 128 and bearing pad 106 together define the first fluid damper cavity 124, and the rigid portion 138 of the outer wall 128 and semi-rigid portion 140 of the inner wall 130 together define the second fluid damper cavity 126.

It should be appreciated, that as used herein, the terms "semi-rigid" and "rigid" are relative terms. Accordingly, a portion of a component of the gas radial gas radial bearing 46 described as semi-rigid may be configured to bend, flex, or give way prior to a portion of a component of the gas radial bearing 46 described as rigid. For the embodiment depicted, the semi-rigid portions of the various components are created by forming such portions with a lesser thickness as compared to the rigid portions of such components. Further, a component of the gas radial bearing 46 described as "semi-rigid" herein refers to a component configured to bend, flex, or give way during normal operation of the gas radial bearing 46 while incurring little or no damage.

Additionally, for the embodiment depicted, the first fluid damper cavity 124 is in flow communication with the second fluid damper cavity 126 through a portion of the column 116. For example, the exemplary column 116 depicted is configured as a double-walled column 116 formed from a portion of the inner wall 130 and a portion of the outer wall 128. Accordingly, the column 116 may be supported at a radially outer end by the rigid portion 138 of the outer wall 128 and the semi-rigid portion 140 of the inner wall 130. Further, for the depicted embodiment, a radially inner end of the portion of the column 116 formed by the inner wall 130 is attached to the bearing pad 106 (or rather formed integrally with the bearing pad 106), and the portion of the column 116 formed by the outer wall 128 is attached to the bearing pad 106 through the semi-rigid portion 136 of the outer wall 128.

Moreover, for the illustrated embodiment, the inner wall 130 defines an inner channel 142 for providing the bearing pad 106 with the working fluid, and the outer wall 128 and inner wall 130 together define an outer channel 144. As will be appreciated, for the embodiment depicted, the outer channel 144 is concentric with the inner channel 142 and defines a substantially annular shape around the inner channel 142. Further, for the embodiment depicted, the outer channel 144 is configured as a clearance gap, such that the first fluid damper cavity 124 and the second fluid damper cavity 126 are in restrictive flow communication through the outer channel 144.

When a force acts on the bearing pad 106, such as when a rotary component supported by the gas radial bearing 46 presses on the bearing pad 106 generally along the radial direction R2, the portion of the housing 110 forming the damper assembly may allow for the bearing pad 106 to move along the radial direction R2, absorbing such force. More particularly, for the embodiment shown, as the column 116 supporting the bearing pad 106 moves up, the semi-rigid portion 136 of the outer wall 128 partially deforms (decreasing a volume of the first fluid damper cavity 124). Further, for the illustrated embodiment, a portion of the damping fluid within the first fluid damper cavity 124 is forced through the outer channel 144 of the column 116, configured as a clearance gap, and flows into the second fluid damper cavity 126. At the same time, the rigid portion 138 of the outer wall 128 may remain substantially stationary, and the semi-rigid portion 140 of the inner wall 130 may partially deform to increase a volume of the second fluid damper cavity 126 and accept the portion of the dampening fluid provided through the outer channel 144 of the column 116 from the first fluid damper cavity 124. For the depicted embodiment, such movement absorbs the force exerted on the bearing pad 106, and dampens such movement. For example, the relatively tight clearance of the outer channel 144/clearance gap resists relatively quick movement of the bearing pad 106 along the radial direction R2. In the absence of the force exerted on the bearing pad 106, the dampening fluid transferred to the second fluid damper cavity 126 may reverse in flow direction, and flow back through the outer channel 144 of the column 116 to the first fluid damper cavity 124.

Figure 12:
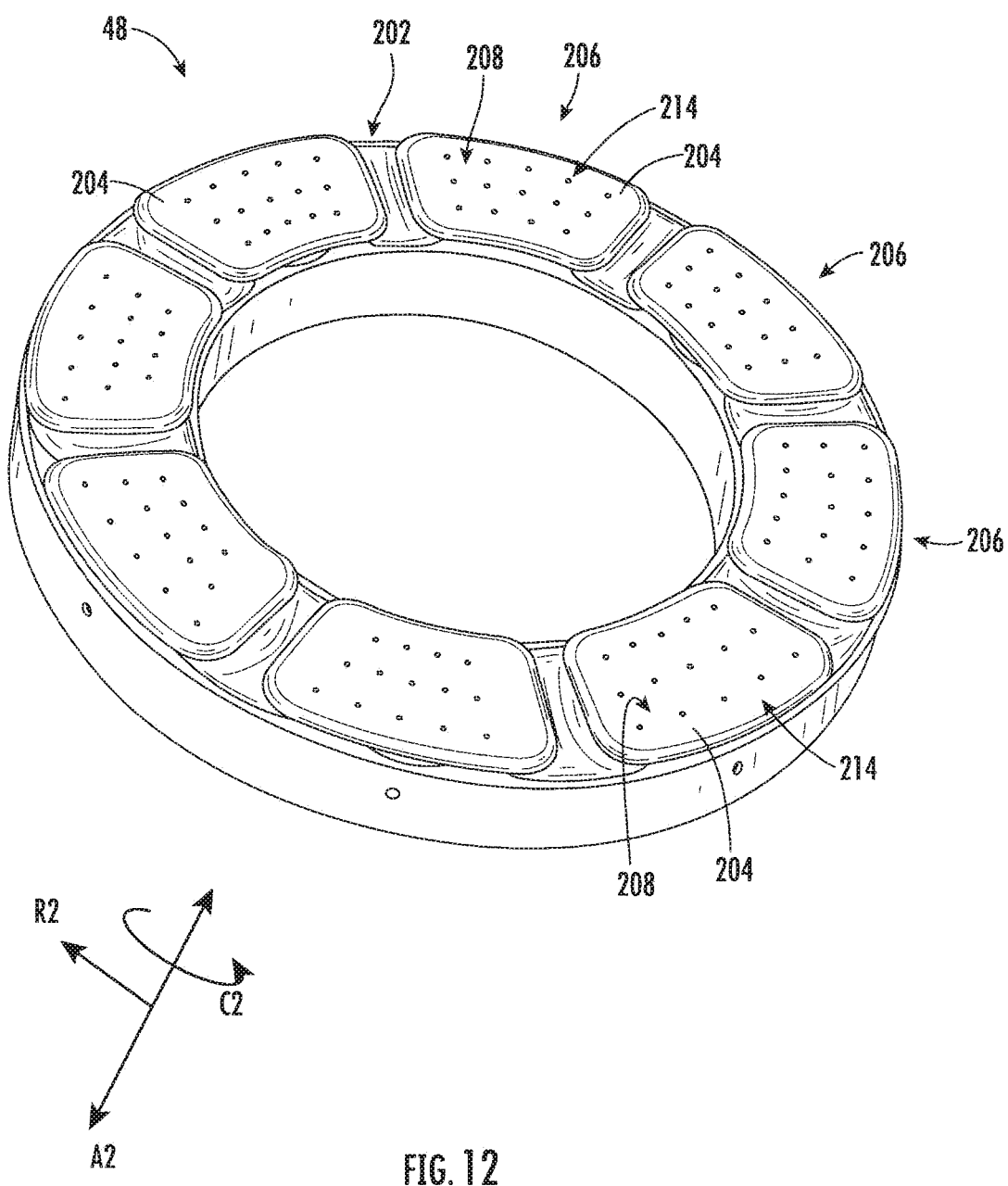
FIG. 12 is a view of one embodiment of a gas thrust bearing according to aspects of the present disclosure.
Figure 13:
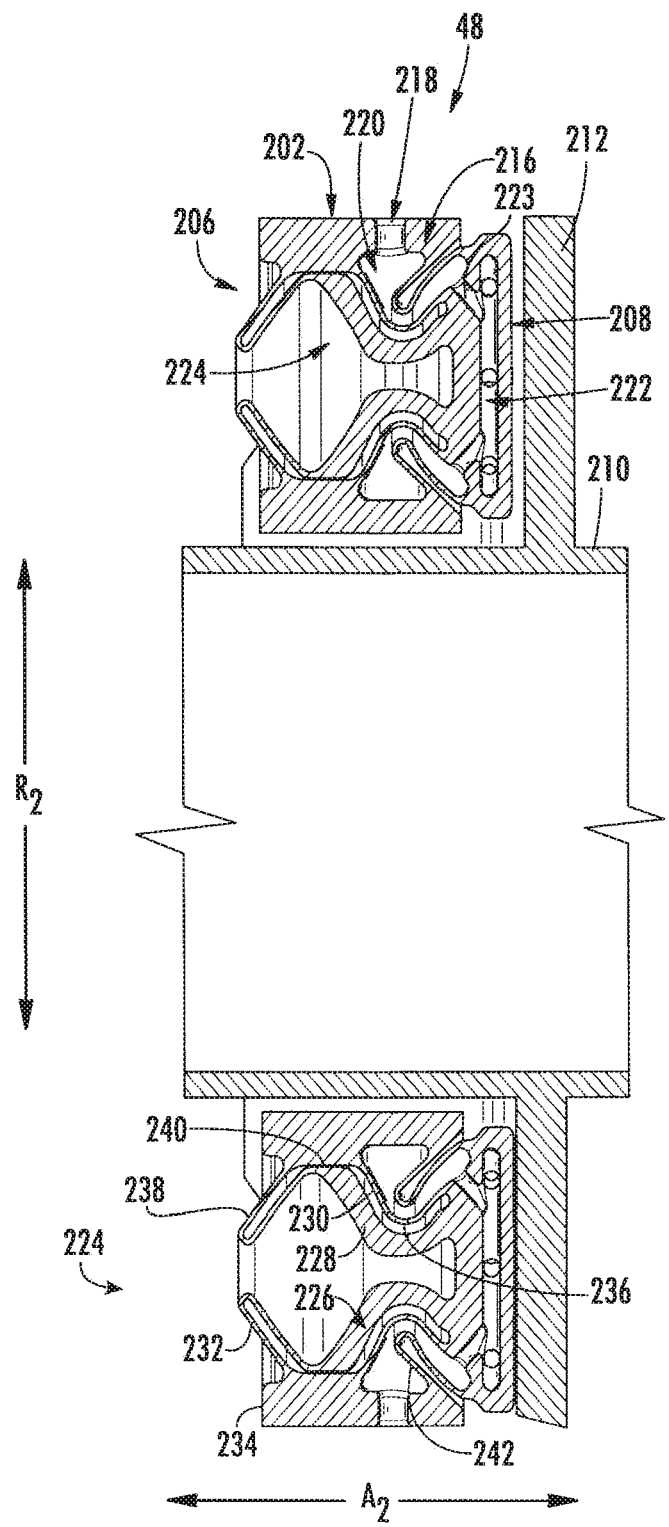
FIG. 13 is a cross-sectional view of an exemplary gas thrust bearing according to aspects of the present disclosure.

Referring now to FIGS. 12-13, views of a gas thrust bearing 48 are illustrated in accordance to aspects of the present disclosure as may be incorporated into the exemplary bearing assemblies of FIGS. 3-8 as described above. More particularly, FIG. 12 shows a view of an exemplary gas thrust bearing 48. FIG. 13 shows a cross-sectional view of a gas thrust bearing 48. It should be recognized that any other gas thrust bearing 48 or other fluid bearing may be used to support the drivetrain 20. Further, the exemplary gas thrust bearing 48 is provided for example only and is not limiting on the invention.

The gas thrust bearing 48 generally includes a housing 202 and a bearing pad 204, or rather, for the embodiment depicted, the gas thrust bearing 48 generally includes a plurality of sections 206, each section 206 including a portion of the housing 202 and a bearing pad 204. For each section 206, the bearing pad 204 may include a thrust face 208 or surface for supporting a vibration (also referred to as a thrust load) along the axial direction A2 of the gas thrust bearing 48. Accordingly, the gas thrust bearing 48 may be referred to as a thrust bearing. The axial vibration may be generated by a rotary component 210 of a heat engine into which the gas thrust bearing 48 is installed, such as the drivetrain 20. The rotary component 210 may include a thrust runner 212 extending outward generally along the radial direction R2 for interfacing with the gas thrust bearing 48.

For the embodiment depicted, the bearing pads 204 of each of the plurality of sections 206 are substantially identical and are substantially evenly spaced along the circumferential direction C2. Further, as will be discussed in greater detail below, the bearing pads 204 of each of the plurality of sections 206 of the exemplary embodiment are configured to receive a flow of working fluid (e.g., air, compressed air and combustion gases, or the like) during operation to create separation with the rotary component 210 by creating a thin film of working fluid between the bearing pad 204 and rotary component 210. For instance, the working fluid may be a supercritical working fluid such as sCO2. The gas thrust bearing 48 may, in such a manner, provide a low friction means for supporting such rotary component 210 (or rather the thrust runner 212 of the rotary component 210).

More particularly, the exemplary bearing pads 204 are configured to disperse and/or diffuse the working fluid to support and/or lubricate the rotary component 210 during operation of the gas thrust bearing 48. For example, the bearing pad 104 depicted generally includes a plurality of gas distribution holes 214 disposed across the bearing pad 204 to provide an evenly distributed pressure field on the thrust face 208 for supporting and/or lubricating the rotary component 210.

The plurality of gas distribution holes 214 may be configured having any dimensions or arrangements (e.g., array, pattern or configuration) suitable to function as described herein. In some embodiments, each bearing pad 204 may have a sufficiently high gas permeability to permit the working fluid to generate sufficient pressure on the thrust face 208 to provide the support and/or lubrication for the rotary component 210. Alternatively still, each bearing pad 104 may define a recessed portion at a center of the bearing pad 204 for delivering the working fluid.

As depicted for the exemplary embodiment, the housing 202 included within such section 206 is configured to provide the flow of working fluid to the thrust face 208 of the bearing pad 204. For instance, the housing 202 may define a working fluid delivery system 216 for providing the flow of pressurized working fluid to the thrust face 208 of the bearing pad 204. The working fluid delivery system 216 defined by the housing 202 generally includes an inlet gas port 218 for receiving a flow of pressurized fluid and a working fluid delivery chamber 220. When the gas thrust bearing 48 is installed in heat engine 10, the inlet gas port 218 may be in airflow communication with, e.g., one or more locations of a compressor section 23 or the expander section 26.

For the embodiment illustrated, the working fluid delivery chamber 220 is in airflow communication with the inlet gas port 218 and is located downstream of the inlet gas port 218. For example, the working fluid delivery chamber 220 is configured to provide the pressurized flow of working fluid directly to the bearing pad 204. For the embodiment depicted, the exemplary bearing pad 204 defines a labyrinth of channels 222 in airflow communication with the working fluid delivery chamber 220 via one or more connection channels 223. The channels 222 may be configured to disperse a flow of pressurized working fluid from the working fluid delivery chamber 220 through the plurality of gas distribution holes 214 defined by the bearing pad 204 (i.e., through the thrust face 208).

Referring still to the section 206 of the gas thrust bearing 48 depicted in FIGS. 12-13, the housing 202 may additionally include a damper assembly 224 for dampening axial vibrations of the rotating assembly supported by the thrust face 208 of the bearing pad 204. For instance, the exemplary housing 202 depicted further defines a fluid damper cavity 226 for providing a dampening of axial vibration of the rotating assembly supported by the thrust face 208 of the bearing pad 204 along the axial direction A2. The housing 202 of the exemplary gas thrust bearing 48 generally includes a rigid column 228, a first semi-rigid wall 230, a second semi-rigid wall 232, and a body portion 234. For the embodiment depicted, the rigid column 228 is attached to or formed integrally with the bearing pad 204. For the shown embodiment, the first semi-rigid wall 230 is attached to or formed integrally with the bearing pad 204 and extends to the body portion 234 of the housing 202. Additionally, for the illustrated embodiment, the second semi-rigid wall 232 extends between the rigid column 228 and the body portion 234 of the housing 202.

Moreover, for the embodiment depicted, the exemplary fluid damper cavity 226 defined by the housing 202 includes a first control volume 236, a second control volume 238, and a damper gap 240. The first control volume 236 is in restrictive flow communication with the second control volume 238 through the damper gap 240. Additionally, for the embodiment shown, the first semi-rigid wall 230 and rigid column 228 together define at least in part the first control volume 236, and the second semi-rigid wall 232 defines at least in part the second control volume 238. The damper gap 240 may be defined between the rigid column 228 and a rigid body portion 234 of the housing 202.

Notably, for the embodiment depicted, the fluid damper cavity 226 is a sealed fluid damper cavity (i.e., defines a fixed volume at constant temperatures and pressures) and during operation is completely filled with an incompressible fluid, such as an incompressible oil or other incompressible liquid. Accordingly, in the embodiment illustrated, when an axial vibration is exerted on the bearing pad 204 along the axial direction A2, the bearing pad 204 may absorb such force by moving inward towards the housing 202. In response, the first semi-rigid wall 230 of the housing 202 may deform in such a manner that a volume of the first control volume 236 of the fluid damper cavity 226 decreases by a certain amount ("deltaV"). For the illustrated embodiment, the decrease in volume of the first control volume 236, deltaV, forces an amount of incompressible fluid through the damper gap 240 and into the second control volume 238. The second semi-rigid wall 232 of the housing 102 may simultaneously deform in such a manner that a volume of the second control volume 238 of the fluid damper cavity 226 increases in the same amount that the first control volume 236 decreases (i.e., deltaV), such that the second control volume 238 receives all of the transferred incompressible fluid.

Notably, the damper gap 240 may define a relatively small clearance, such that the damper gap 240 may resist vibratory movement of the bearing pad 204 along the axial direction A2. For the illustrated embodiment, such a configuration provides the viscous energy dissipation, and therefore dampening. Accordingly, a size of the damper gap 240 may be designed for the anticipated amount of dampening required. Further, in the absence of the thrust force exerted on the bearing pad 204, the incompressible fluid transferred to the second control volume 238 may reverse in flow direction, and flow back through the damper gap 240 to the first control volume 236.

As is also depicted in the exemplary embodiment of FIG. 12-13, the housing 202 further comprises a third, outer semi-rigid wall 242 extending between the body portion 234 of the housing 202 and the bearing pad 204. For the embodiment shown, the working fluid delivery chamber 220 is defined at least in part by the outer semi-rigid wall 242 and, for the embodiment depicted, is further defined by the first semi-rigid wall 230 and the body portion 234 of the housing 202. Further, the working fluid delivery chamber 220 may be concentric with at least a portion of the fluid damper cavity 226. For example, for the embodiment depicted, the working fluid delivery chamber 220 is concentric with the first control volume 236 of the fluid damper cavity 226.

Notably, for the embodiment depicted, the outer semi-rigid wall 242 is attached to or formed integrally with the bearing pad 204. In addition to providing the dampening forces described above, the various semi-rigid walls may also act to support the bearing pad 204 and resist an axial vibration acting on the bearing pad 204. For example, during operation, the various semi-rigid walls may act as springs for supporting the bearing pad 204 and limiting axial deflections of the rotating assembly.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hermetically sealed heat engine, the heat engine comprising:
   a rotating drivetrain comprising:
      a compressor section and an expander section, the compressor section and expander section together defining at least in part a closed flowpath for the flow of a working fluid; and
      a heat exchanger thermally coupled to the closed flowpath for adding heat to the working fluid; and
   a fluid bearing assembly configured to utilize the working fluid to support the rotating drivetrain, the fluid bearing assembly being hermetically sealed with the closed flowpath, the fluid bearing assembly comprising:
      a plurality of fluid bearings; and
      a sealing system hermetically sealed with the closed flowpath, the sealing system comprising:
         a plurality of containment structures, wherein each containment structure of the plurality of containment structures surrounds a respective fluid bearing of the plurality of fluid bearings and includes a plurality of seals, and wherein the plurality of containment structures defines a hermetically sealed portion of the fluid bearing assembly; and
         a lubrication flowpath configured to supply the plurality of containment structures and the plurality of fluid bearings with the working fluid and collect the working fluid after the working fluid lubricates the plurality of fluid bearings.

2. The heat engine of claim 1, wherein the working fluid is a supercritical fluid.

3. The heat engine of claim 2, wherein the supercritical fluid comprises:
   a supercritical carbon dioxide.

4. The heat engine of claim 1, further comprising:
   a compressor bleed valve at the compressor section, wherein the compressor bleed valve supplies the sealing system with the working fluid.

5. The heat engine of claim 1, further comprising:
   an expander bleed valve at the expander section, wherein the expander bleed valve supplies the sealing system with the working fluid.

6. The heat engine of claim 1, wherein the rotating drivetrain further comprises an output shaft, and wherein the heat engine further comprises:
   an electric machine drivingly coupled to the output shaft.

7. The heat engine of claim 6, further comprising:
   a gearbox coupling the output shaft to the electric machine.

8. The heat engine of claim 1, wherein the plurality of fluid bearings includes a gas radial bearing and a gas thrust bearing.

9. The heat engine of claim 1, wherein the compressor section comprises a compressor and the expander section comprises an expander, and wherein the rotating drivetrain further comprises:
   a coupling connecting the compressor to the expander.

10. The heat engine of claim 9, wherein the coupling is a flexible coupling.

11. The heat engine of claim 9, wherein the coupling is a rigid coupling.

12. The heat engine of claim 1, wherein the heat engine is a waste heat recovery heat engine, and wherein the heat exchanger is configured to receive heat from a combustion gas of a gas turbine engine.

13. The heat engine of claim 1, wherein the heat engine is a solar power helio-stat field heat engine, and wherein the heat exchanger is configured to receive heat collected by a helio stat field.

14. The heat engine of claim 1, further comprising:
   a hermetically sealed power drivetrain comprising:
      a power expander defining at least in part the closed flowpath for the flow of the working fluid; and
      an electric machine drivingly coupled to the power expander; and
   a power fluid bearing assembly configured to utilize the working fluid to support the power drivetrain, the power fluid bearing assembly being hermetically sealed with the closed flowpath.

15. The heat engine of claim 1, wherein the rotating drivetrain further comprises a shaft coupled to the compressor section and the expander section, and wherein the plurality of seals of each containment structure of the plurality of containment structures includes a forward seal and an aft seal configured to form a seal with the shaft.

16. A hermetically sealed heat engine for power generation, the heat engine comprising:
   a rotating drivetrain comprising:
      a compressor section and an expander section, the compressor section and expander section together defining at least in part a closed flowpath for the flow of a working fluid;
      a shaft coupled to the compressor section and the expander section;
      a heat exchanger thermally coupled to the closed flowpath for adding heat to the working fluid;
      an output shaft; and
      an electric machine drivingly coupled to the output shaft; and
   a fluid bearing assembly configured to support the rotating drivetrain, the fluid bearing assembly comprising:
      a plurality of fluid bearings; and
      a sealing system, the sealing system being hermetically sealed with the closed flowpath, the sealing system comprising:
         a plurality of containment structures, wherein each containment structure of the plurality of containment structures surrounds a respective fluid bearing of the plurality of fluid bearings and includes a forward seal and an aft seal configured to form a seal with the shaft, and wherein the plurality of containment structures defines a hermetically sealed portion of the fluid bearing assembly; and
         a lubrication flowpath configured to supply the plurality of containment structures and the plurality of fluid bearings with the working fluid and collect the working fluid after the working fluid lubricates the plurality of fluid bearings, wherein the plurality of containment structures are configured to collect the working fluid and return the working fluid to the lubrication flowpath.

17. The heat engine of claim 16, wherein the working fluid is a supercritical fluid.

18. The heat engine of claim 17, wherein the supercritical fluid comprises supercritical carbon dioxide.

19. The heat engine of claim 16, further comprising:
   a bleed valve at at least one of the compressor section or expander section, wherein the bleed valve supplies the sealing system with the working fluid.

* * * * *